US012706291B2

(12) United States Patent
Froehlich et al.

(10) Patent No.: US 12,706,291 B2
(45) Date of Patent: Aug. 11, 2026

(54) QUADRUPOLE ION OPTICAL DEVICE

(71) Applicant: Thermo Fisher Scientific (Bremen) GmbH, Bremen (DE)

(72) Inventors: Ulf Froehlich, Bremen (DE); Dennis Hohenaecker, Bremen (DE); Johannes Schwieters, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 524 days.

(21) Appl. No.: 17/993,630

(22) Filed: Nov. 23, 2022

(65) Prior Publication Data

US 2024/0105438 A1 Mar. 28, 2024

(30) Foreign Application Priority Data

Sep. 27, 2022 (DE) ........................ 202022105432.0

(51) Int. Cl.
*H01J 49/42* (2006.01)

(52) U.S. Cl.
CPC ................................ *H01J 49/4215* (2013.01)

(58) Field of Classification Search
None
See application file for complete search history.

(56) References Cited

U.S. PATENT DOCUMENTS

2004/0195502 A1* 10/2004 Hashimoto ......... H01J 49/0481 250/288
2009/0294663 A1* 12/2009 Muntean ............... H01J 49/063 250/292
2015/0041642 A1* 2/2015 Okumura .............. H01J 49/063 250/290
2015/0170898 A1* 6/2015 Jiang ................... H01J 49/0027 250/282
2017/0047214 A1* 2/2017 Deerberg .............. H01J 49/025
2020/0373146 A1* 11/2020 Hauschild ............. H01J 49/427

* cited by examiner

*Primary Examiner* — James Choi
(74) *Attorney, Agent, or Firm* — ALG Intellectual Property, LLC

(57) ABSTRACT

Quadrupole ion optical devices configured to arrange paths of each of a plurality of ion beams exiting from a mass analyser towards detector elements of a mass spectrometer. Example quadrupole ion optical device comprise a plurality of electrodes arranged around a central axis and configured to generate a quadrupole potential through which the path of each of the plurality of ion beams can be passed, and electrical circuitry configured to supply at least a first set of voltages or a second set of voltages to the plurality of electrodes. The application of the second set of voltages generates a quadrupole potential having a saddle point at a position in a plane normal to the central axis that is displaced compared to a position in a plane normal to the central axis for a saddle point of a quadrupole potential generated upon application of the first set of voltages.

21 Claims, 12 Drawing Sheets

QUADRUPOLE ION OPTICAL DEVICE

TECHNICAL FIELD

A quadrupole ion optical device for arrangement between a mass analyser and a plurality of collector elements. Electrical circuitry is configured to supply voltages to electrodes at the quadrupole ion optical device, such that the location can be adjusted of a saddle point in the quadrupole potential generated upon application of voltages at the electrodes, consequently modifying the deflection experienced by ion beams passing therethrough. Also described is a mass spectrometer, and a method for mass spectrometry.

BACKGROUND TO THE DISCLOSURE

In mass spectrometry, ions exit a mass analyser and are directed towards a detector element. In some cases, the detector elements may be a plurality of collector elements, such as Faraday collectors.

The configuration of elements of an example mass spectrometer are shown in FIG. 1. Sample ions 12 pass from an ion source 10 and through a mass analyser 14. Ions exit the mass analyser and travel towards the detector elements 16. Ions of different species within a sample will exit the analyser so as to be spaced apart from each other in a lateral direction wherein the spacing is proportional to their mass-to-charge ratio. Successive ions having a particular mass-to-charge ratio can be considered to move in the same direction as an ion beam. Each ion beam 18*a*, 18*b*, 18*c* can be received at a different collector element, wherein the relative position of the collector elements allows determination of the spacing of the beams and so the mass-to-charge ratio of the ion species. Moreover, the ion intensity measured at each detector element indicates the abundance of the given ion species in the sample. Accurate measurements therefore require all the ions within a particular ion beam to be measured at the detector surface of a detector element.

The detector elements measure incoming ions most efficiently if they are correctly aligned compared to the detector surface. This is particularly the case where Faraday collectors or other 'cup' style collector elements are used. In particular, the ions will ideally enter through the opening of such cup style collectors in a direction normal to the plane of the detector surface and normal to the plane of the opening to the collector element, in order that the ions reach the back or closed end of the detector without impingement at a side wall.

Some mass spectrometers will include a plurality of detector elements. Often, only some of those detector elements will be used, being those detector elements having the best alignment to ion beams generated for a particular sample. Two types of alignment of a detector element are required for a more accurate measurement of the ion beam. Firstly, small adjustments may be made to the position of each detector element relative to another, to place them in a better location to receive each ion beam. Secondly, the orientation of a detector element compared to the incident ion beam may be adjusted, to optimise the angle of the ion beam on entry to the detector element. Although some mass spectrometers allow for physical movement of each detector element to achieve these types of alignment, this is not always the case. Even where such adjustments to the detector elements are possible, then the process of alignment and adjustment is time-consuming and complicated.

FIG. 2 shows a known arrangement of an example mass spectrometer in which ion beams 118*a*, 118*b*, 118*c*, 118*d* exit the mass analyser 114 so as to be spaced apart proportional to their mass-to-charge ratio. A detector element 116*a*, 116*b*, 116*c*, 116*d* is positioned to receive each ion beam. Moreover the tilt or orientation of each detector element 116*a*, 116*b*, 116*c*, 116*d* is set independently to optimise the alignment compared to the direction of the ion beam. FIG. 2 shows the ideal orientation for the detector elements, in which the ion beam is incident orthogonal to a detector surface (for example detector surface 120 of detector element 116*a*) at the closed end of each detector element. In other words, the angle between the direction of the ion beam and the normal to the detector surface is zero or close to zero.

To reduce the burden of making adjustments such as those described, International Patent publication no. WO 97/15944 describes the use of ion optics (a "zoom lens") to deflect ion beams exiting from a mass analyser towards a required optical axis. The zoom lens is a double quadruple field element, which is used to provide fairly small deflections (for instance, with magnification 1.5 to a demagnification of 0.66) to each ion beam. The deflection of each ion beam is used to better direct each beam into one of a fairly large number of detectors that are closely spaced and typically fixed in place. International Patent publication no. WO 97/15944 describes that small adjustments in magnification at the zoom lens can be used to better direct each ion beam towards one or more of the detectors. Nevertheless, where ion beams are deflected in this way, the angle of incidence at a detector surface for some of the ion beams is moved further from normal. This makes those ion beams more likely to strike the sides of the detector, rendering the measured signal inaccurate.

Accordingly, an apparatus and method that address these shortcomings would be of great value.

SUMMARY OF THE DISCLOSURE

In a first aspect there is a quadrupole ion optical device, for arrangement in a path of each of a plurality of ion beams exiting from a mass analyser towards detector elements of a mass spectrometer, the plurality of ion beams being laterally separated at an exit from the mass analyser, the separation between the plurality of ion beams being proportional to the mass-to-charge ratio of ions in each of the plurality of ion beams, the quadrupole ion optical device comprising:

a plurality of electrodes, arranged around a central axis and configured to generate a quadrupole potential through which the path of each of the plurality of ion beams can be passed, the application of voltages to the plurality of electrodes generating a quadrupole potential in a region bounded by the plurality of electrodes; and electrical circuitry configured to supply at least a first set of voltages or a second set of voltages to the plurality of electrodes, each voltage of the first or second set of voltages to be applied to one or more electrodes of the plurality of electrodes;

wherein application of the second set of voltages generates a quadrupole potential having a saddle point at a position in a plane normal to the central axis that is displaced compared to a position in a plane normal to the central axis for a saddle point of a quadrupole potential generated upon application of the first set of voltages.

In a second aspect there is a mass spectrometer, comprising:

a mass analyser;

a plurality of detector elements; and the quadrupole ion optical device as described above, wherein the quadrupole ion optical device is arranged between the mass analyser and the plurality of detector elements, such that a plurality of ion beams exiting from the mass analyser towards the plurality of detector elements pass through the quadrupole potential generated by the plurality of electrodes at the quadrupole ion optical device.

In a third aspect there is a method of mass spectrometry, comprising:

passing one or more ion beams exiting from a mass analyser through a quadrupole potential generated by a quadrupole ion optical device and towards one or more detector elements;

adjusting the position of a saddle point of the quadrupole potential, to optimise the alignment of each of the one or more ion beams into a respective one of the one or more detector elements.

LIST OF FIGURES

The invention may be put into practice in various ways, some of which will now be described by way of example only and with reference to the accompanying drawings in which.

It will be understood that like features are labelled using like reference numerals. The figures are not to scale.

DETAILED DESCRIPTION OF SPECIFIC EXAMPLES

This disclosure describes a quadrupole ion optical device for use in a mass spectrometer. The quadrupole ion optical device can be used to improve alignment of ion beams with detector elements. More specifically, the quadrupole ion optical device can be used to deflect the path of ions beams after exiting a mass analyser, so as to minimise the angle of an incident ion beam from normal at a detector surface of a respective detector element. The quadrupole ion optical device of the present disclosure is configured to allow the saddle point (or centre of the electric field) of the quadrupole potential to be moved or displaced. Said displacement allows the extent of deflection to be minimised for the ion beam of the group of ion beams of interest that undergoes the greatest deflection. This in turn causes the alignment to a detector element for the group of ion beams of interest to be improved overall.

It will be understood that an ion beam moving through a saddle point in the quadrupole potential will not experience any deflection. In comparison, ion beams passing through the quadrupole potential at a point away from the centre of the saddle point will be deflected. Typically, due to the shape of the potential around the saddle point (which is not a linear contour from the centre towards the edges) the deflection will be at a larger angle for ion beams that pass through the quadrupole potential further from the saddle point. As such, the presently described quadrupole ion optical device permits the location of the saddle point in the quadrupole potential to be moved or displaced so as to minimise the deflection experienced overall by a group of ion beams of interest.

Figure 1:
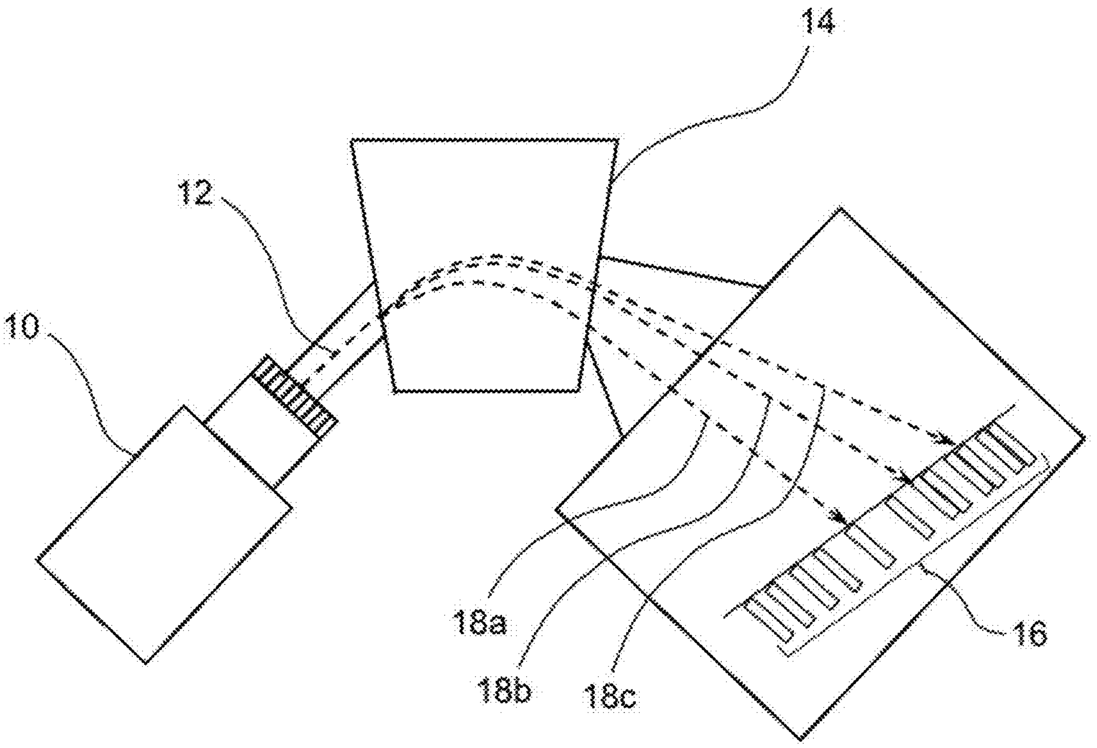
FIG. 1 shows a highly schematic representation of a mass spectrometer.
Figure 2:
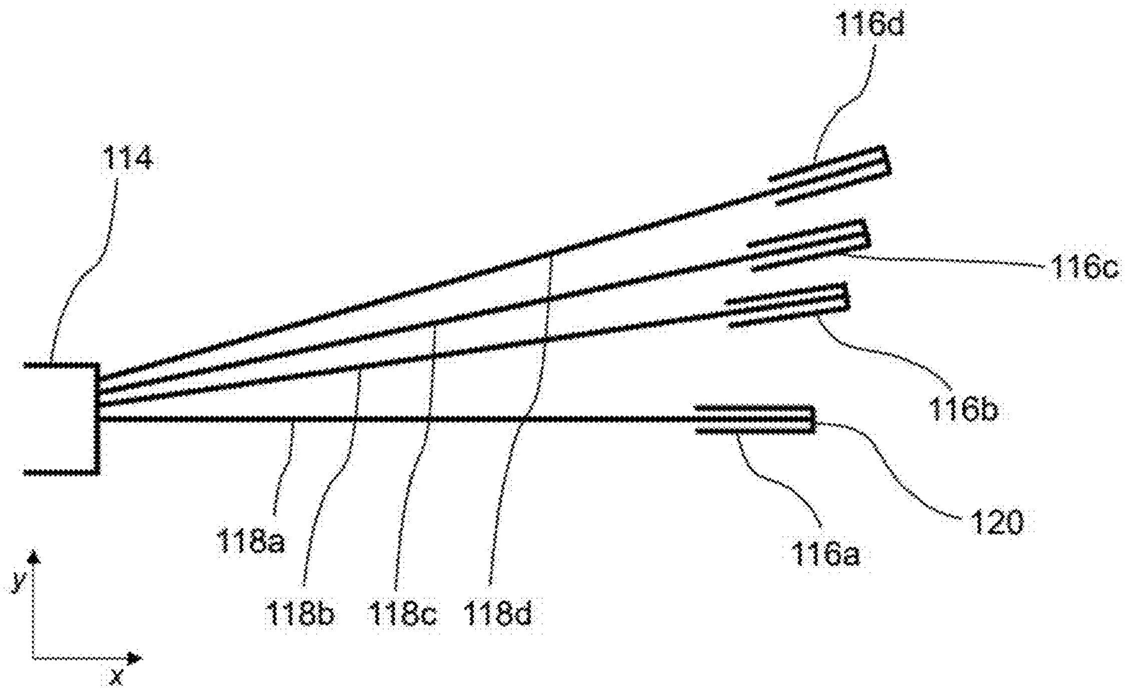
FIG. 2 shows an ideal alignment of ion beams exiting a mass analyser and directed towards detector elements.
Figure 3:
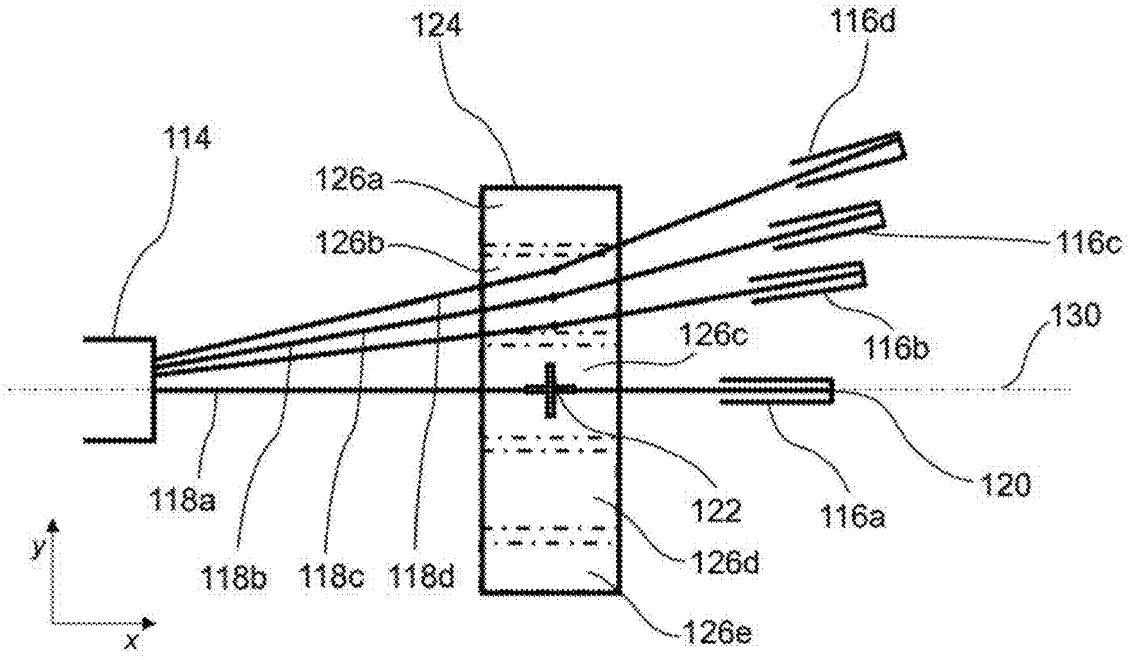
FIG. 3 shows a quadrupole ion optical device in a mass spectrometer when a first set of voltages are applied to the plurality of electrodes of the quadrupole ion optical device.

Referring to FIG. 3, there is a schematic representation of elements of a mass spectrometer, including a quadrupole ion optical device 124 according to the present disclosure. The quadrupole ion optical device 124 is arranged in a path of each of a plurality of ion beams 118*a*, 118*b*, 118*c*, 118*d* exiting from a mass analyser 114 and travelling towards a plurality of detector elements 116*a*, 116*b*, 116*c*, 116*d* of a mass spectrometer. The plurality of ion beams 118*a*, 118*b*, 118*c*, 118*d* are laterally separated at an exit from the mass analyser 114, the separation being proportional to the mass-to-charge ratio of ions in each of the plurality of ion beams.

The quadrupole ion optical device 124 comprises a plurality of electrodes 126*a-j*. The electrodes are arranged around a central axis 130, and may be arranged around the walls of an open box, having a cavity 128 or open bore therethrough. Considering a cross-sectional plane through the cavity 128 of the open box (and orthogonal to the central axis 130), the electrodes 126*a-j* would be arranged at the perimeter of the cavity 128 so as to bound an area between the electrodes. Once voltages are applied to the electrodes 126*a-j*, then a quadrupole potential is generated within the cavity 128, and within the area defined in the cross-sectional plane.

Figure 4:
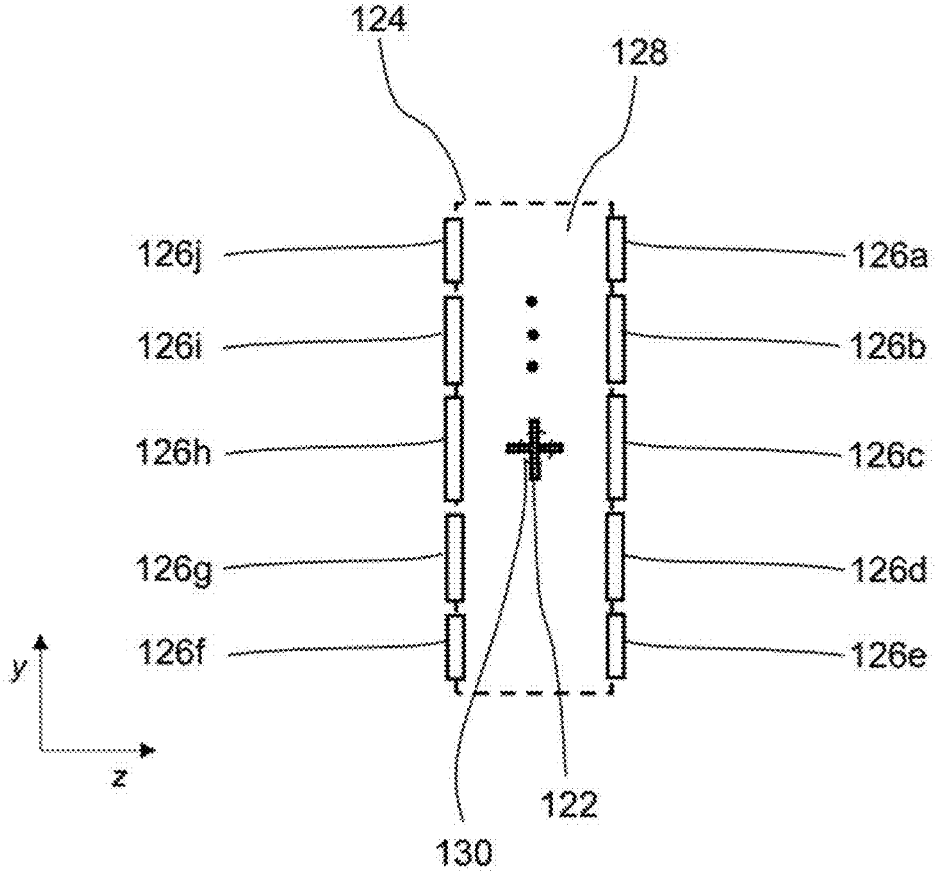
FIG. 4 shows the position of a saddle point of the quadrupole potential generated in the quadrupole ion optical device when a first set of voltages are applied.

FIG. 4 shows a cross-sectional view of the quadrupole ion optical device 124 in the y-z plane, which is the plane normal to the central axis 130 (wherein the ion beams 118*a*, 118*b*, 118*c*, 118*d* shown in FIG. 3, are laterally spaced in the x-y plane). FIG. 4 shows a quadrupole ion optical device 124 having ten electrodes 126*a-j* of differing dimensions arranged around the central axis 130 and at the boundary to the area in which the quadrupole potential is generated. The spacing between different adjacent pairs of electrodes may vary. Specific configurations of the electrodes for the quadrupole ion optical device are discussed further below with respect to FIGS. 7 to 13.

Electrical circuitry (not shown in FIGS. 3 and 4) is connected to each electrode 126*a-j*. The electrical circuitry is configured to supply at least a first set of voltages or a second set of voltages to the plurality of electrodes 126*a-j*. Each set of voltages includes one or more voltage, so that each voltage of the set of voltages is applied to one or more of the plurality of electrodes 126*a-j*. Electrodes may have a different applied voltage than compared to an adjacent electrode, in order to generate a quadrupole potential having a desired shape. Specific configuration for the electrical circuitry for the quadrupole ion optical device 124 are described in more detail below with respect to FIGS. 7 to 13. The electrical circuitry could include application of specified, programmable voltages to each electrode from a respective channel of a digital-to-analogue converter. Alternatively, a first set of voltages could be applied to the electrodes via a first set of resistors configured as a first voltage divider arrangement, whilst a second set of voltages could be applied to the electrodes via a second set of resistors configured as a second voltage divider arrangement. It will be understood that in some examples, the electrical circuitry may be configured to apply more than two sets of voltages.

In the example of FIGS. 3 and 4, a first set of voltages are applied to the electrodes 126*a-j* of the quadrupole ion optical device 124. The saddle point 122 of the quadrupole potential is represented by a cross in both FIG. 3 and FIG. 4. The saddle point 122 is generated at a point aligned with the central axis 130 (and which is at the geometric centre of the area bounded by the electrodes 126*a-j*), so that in this case the centre of the electric potential and the central axis 130 coincides. A first ion beam 118*a* exiting the mass analyser 114 and passing through the saddle point 122 will not be deflected. Accordingly, the first ion beam 118*a* can be straightforwardly aligned with a detector element 116*a*, so as to be incident substantially normal to a detector surface 120 of the detector element. In this example, the first ion beam moves along the optical axis of the mass spectrometer, wherein the optical axis aligns and coincides with the central axis 130 of the quadrupole ion optical device. However, ion beams 118*b*, 118*c*, 118*d* exiting the mass analyser 114 spaced apart from the first ion beam 118*a* pass through a region of the quadrupole potential away from the saddle point 122. Therefore, they undergo deflection when passing through the quadrupole potential. Those ion beams 118*b*, 118*c*, 118*d* spaced furthest from the first ion beam 116*a* undergo the greatest deflection, as can be seen in FIG. 3. This, in turn, causes these ion beams 118*b*, 118*c*, 118*d* to be incident at a detector surface of a detector element 116*b*, 116*c*, 116*d* at a non-zero angle from normal. In some cases, the ion beam 118*d* may even enter a detector element 116*d* at such a significant angle that the ion beam 118*d* strikes the side wall of the detector element 116*d* rather than the detector surface directly. In the configuration of the quadrupole ion optical device 124 shown in FIGS. 3 and 4, there is a large variance in the size of the angle between the incident beam and the normal to the detector surface for each of the plurality of ion beams 118*a*, 118*b*, 118*c*, 118*d*.

The quadrupole ion optical device 124 in the configuration shown in FIGS. 3 and 4 allows the deflected ion beams 118*b*, 118*c*, 118*d* to be directed to a particular detector element 116*b*, 116*c*, 116*d* (even where the detector elements are fixed). However, the alignment of the ion beams 118*b*, 118*c*, 118*d* with the orientation of a detector surface at each respective detector element 116*b*, 116*c*, 116*d* is poor except for the first ion beam 118*a*. This could reduce the efficiency and accuracy of the measurement of the ion current at those detector elements 116*b*, 116*c*, 116*d*.

This problem is overcome in the present invention by providing electrical circuitry which allows for adjustment of the voltages (and more specifically the relative voltages) applied to the electrodes 126*a-j* of the quadrupole ion optical device 124. Adjustment of the relative voltages allows the location of a saddle point 122 of the quadrupole potential (in a plane normal to the central axis 130) to be moved or be displaced. In particular, application of a second set of voltages applied to the electrodes 126*a-j* of the quadrupole ion optical device 124 causes a position of a saddle point 122 of the quadrupole potential to be different than compared to the position of the saddle point 122 of the quadrupole potential upon application of the first set of voltages.

Figure 5:
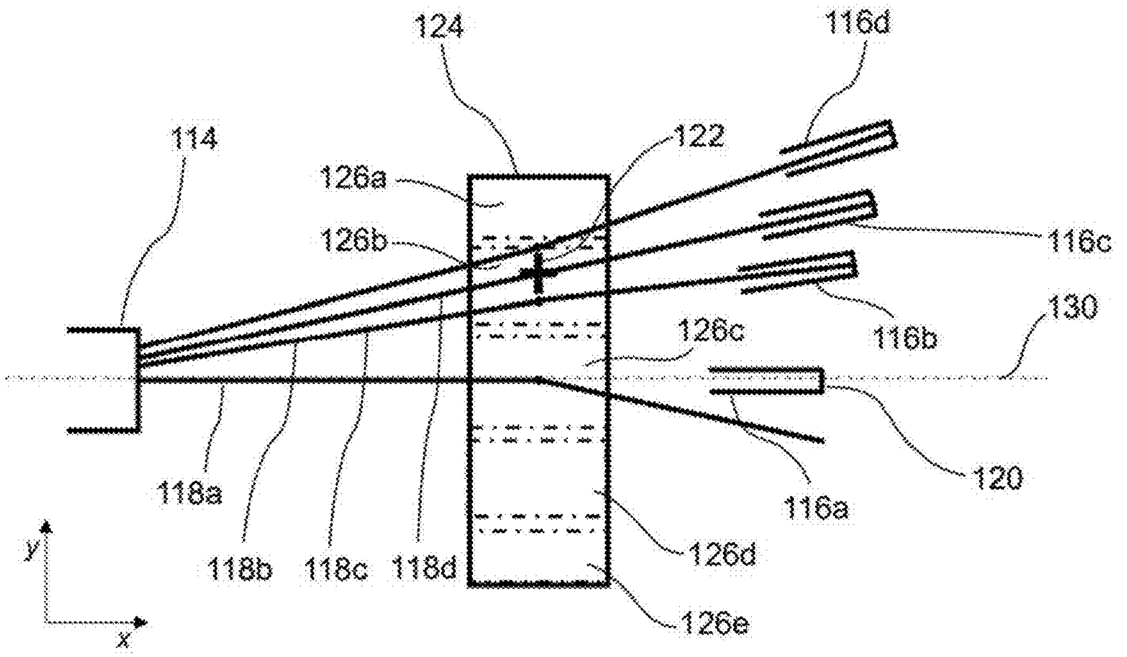
FIG. 5 shows the same quadrupole ion optical device in a mass spectrometer when a second set of voltages are applied to the plurality of electrodes of the quadrupole ion optical device.
Figure 6:
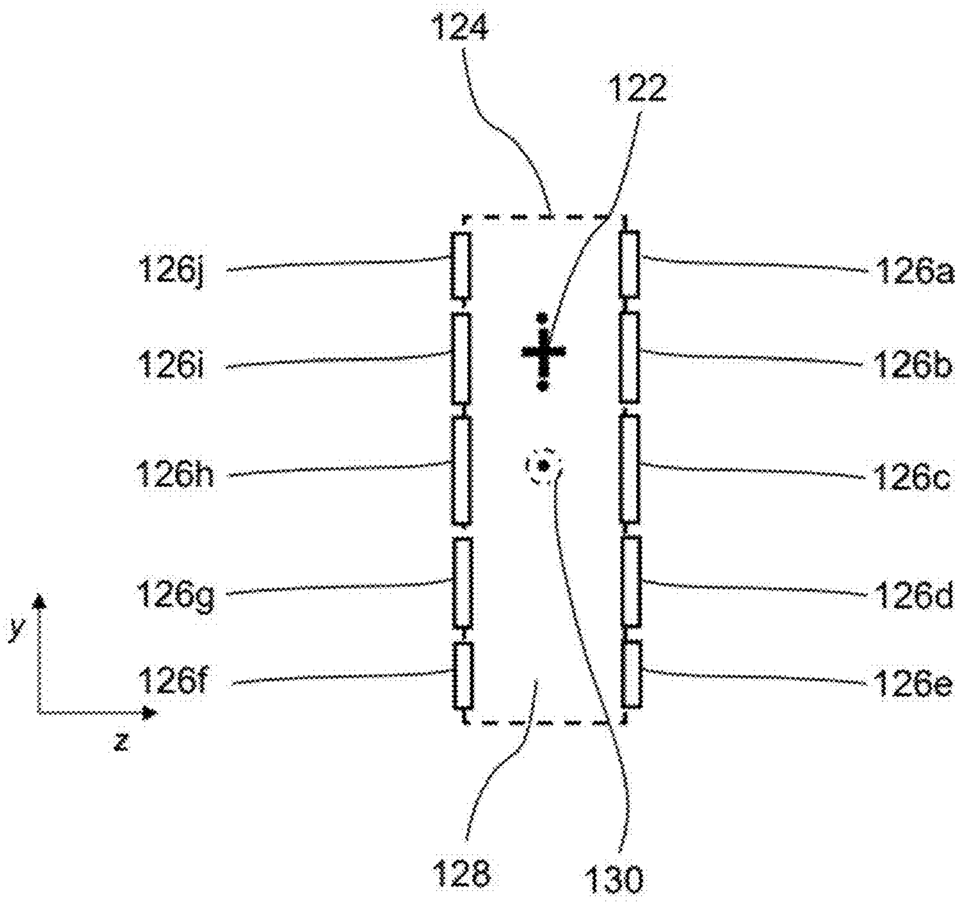
FIG. 6 shows the position of a saddle point of the quadrupole potential generated in the quadrupole ion optical device when a second set of voltages are applied.

FIGS. 5 and 6 show the quadrupole ion optical device 124 represented in FIGS. 3 and 4, but with a second set of voltages applied to the electrodes 126*a-j* of the quadrupole ion optical device 124, the second set of voltages being different than the first set of voltages. FIG. 5 shows a schematic representation of elements of a mass spectrometer (in the x-y plane), including a quadrupole ion optical device 124 according to the present disclosure. The elements of the mass spectrometer (including the position of the electrodes 126*a-j* around the central axis 130) are in the same configuration as in FIGS. 3 and 4, with only the voltages applied being different. FIG. 6 shows a cross-sectional view of the quadrupole ion optical device 124 in the y-z plane.

The second set of voltages generate a saddle point 122 of the quadrupole potential in a different location than compared to the location of the saddle point 122 of the quadrupole potential when the first set of voltages is applied. Specifically, in the arrangement of FIGS. 5 and 6, the saddle point (marked as a cross 122) of the quadrupole potential has been shifted in the y-axis, which is the axis in which the ion beams 118*a*, 118*b*, 118*c*, 118*d* are spaced apart when exiting the mass analyser 114.

The saddle point 122 in the quadrupole potential is shifted under the second set of voltages so as to be in a location that is more central within the span of the spaced out ion beams 118*b*, 118*c*, 118*d* of interest. Here, a 'middle' ion beam 118*c* of the set of ion beams of interest is arranged to pass through the saddle point 122 so that no deflection is experienced by this ion beam. Those ion beams of interest 118*b*, 118*d* to either side of the 'middle' ion beam are still deflected, as they pass through the quadrupole potential in a location away from the saddle point. However, the variation in the extent of the deflection of the plurality of the ion beams of interest 118*b*, 118*c*, 118*d* is minimised compared to the configuration in FIGS. 3 and 4. In other words, the maximum deflection of any one of the group of ion beams of interest 118*b*, 118*c*, 118*d* is minimised.

The arrangement of the saddle point 122 in the quadrupole potential as shown in FIGS. 5 and 6 improves alignment of the ion beams 118*b*, 118*c*, 118*d* with a respective detector element 116*b*, 116*c*, 116*d*. The ion beams of interest 118*b*, 118*c*, 118*d*, as a group, are incident at the detector surface of each respective detector element 116*b*, 116*c*, 116*d* at an angle that is closer to normal than in the configuration of FIGS. 3 and 4. Although any given ion beam may experience a greater deflection after displacement of the saddle point (for example, the first beam 118*a* as shown in FIGS. 5 and 6), the location of the saddle point can be chosen to optimise the alignment of the ion beams of interest 118*b*, 118*c*, 118*d* as a group. For instance, the location of the saddle point 122 may be chosen to minimise the sum of the angles of each ion beam of interest 118*b*, 118*c*, 118*d* compared to the normal of the respective detector surface. Thus, movement or displacement of the saddle point 122 in this way improves the accuracy of the measurement of the ion current at a group of detector elements 116*b*, 116*c*, 116*d* overall.

It will be understood that in some cases, a first measurement can take place with the saddle point in the quadrupole potential at a first location (by application of the first set of voltages) to obtain measurements at the collector elements with the alignment optimised for a first group of the ion beams. Then, a second measurement can take place with the saddle point at the second location (by application of the second set of voltages) to obtain measurements at the collector element with the alignment optimised for a second group of the ion beams. In this way, over the two measurements, a more precise measurement of all of the ion beams can be obtained.

The position of the saddle point of the quadrupole potential can be adjusted by adjusting the set of voltages applied at the plurality of electrodes. Any number of sets of voltages could be applied, to give the saddle point at a respective location. Although in principle the adjustment of the location of the saddle point can be achieved by application of a certain specific set of voltages only, the quality and the homogeneity and quality of the generated quadrupole potential is dependent on the shape, dimensions and spacing of the electrodes, as well as the voltages applied thereon, as described below. Moreover, various configurations for the electrical circuitry could be used to apply voltages to the plurality of electrodes. These could include use of voltage divider arrangements to provide each of a specific set of voltages to each of the plurality of electrodes. More specific details of examples of the invention are discussed below.

Figure 7:
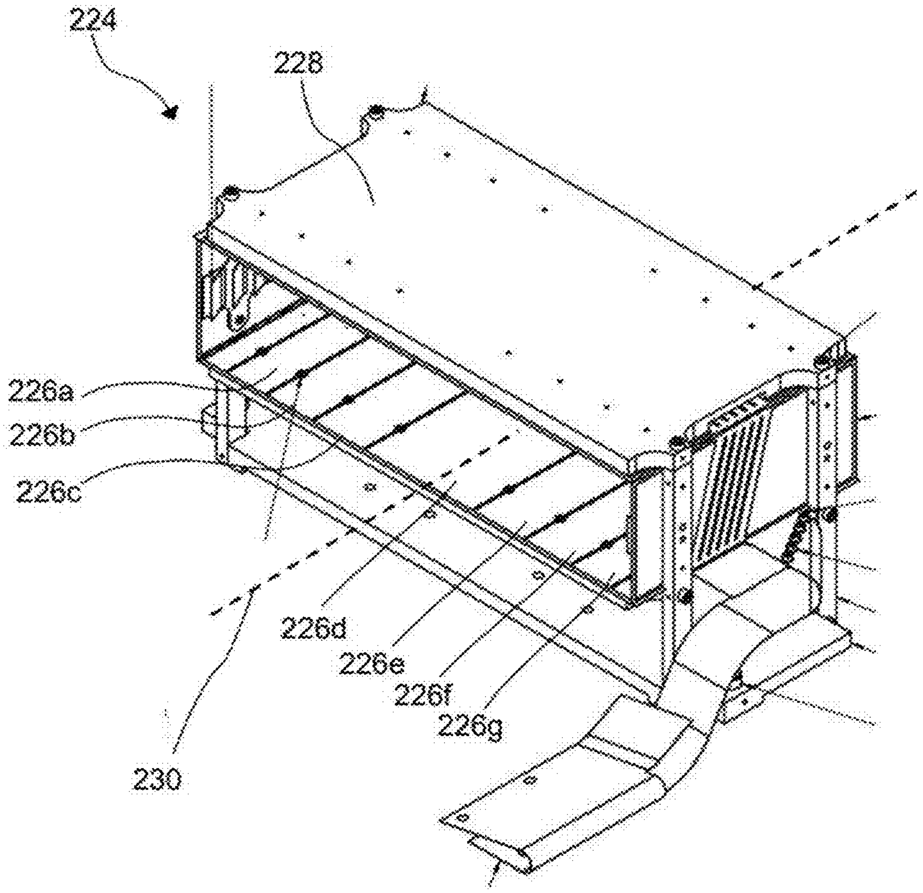
FIG. 7 shows a perspective view of an example of the quadrupole ion optical device.

FIG. 7 shows a perspective view of a quadrupole ion optical device 224 according to the present disclosure. A housing 228 is provided, forming an 'open box' having an open cavity therethrough. Electrodes 226*a-g* are arranged around a central axis 230 on the inner surface of the housing 228. The electrodes 226*a-g* are spaced apart from each other and each connected to electrical circuitry via printed circuit boards. When voltages are applied to the electrodes 226*a-g*, a quadrupole potential is generated in the open cavity.

The electrodes 226*a-g* arranged on the inner surface of the housing may have various different configurations. The configuration of the electrodes 226*a-g* (including their dimensions, arrangement and spacing) will affect the quality of the quadrupole potential. The variance in the electric potential from an ideal quadrupole potential is a measure of the quality of the quadrupole potential. Ideally, an area (considering a cross-section through the quadrupole potential, the cross-section being a plane orthogonal to the central axis 230) having relatively small variance in the electric potential from an ideal quadrupole potential will be generated, such that the area is large enough for all of the ion beams 118*a-d* exiting a mass analyser to pass through.

Figure 8:
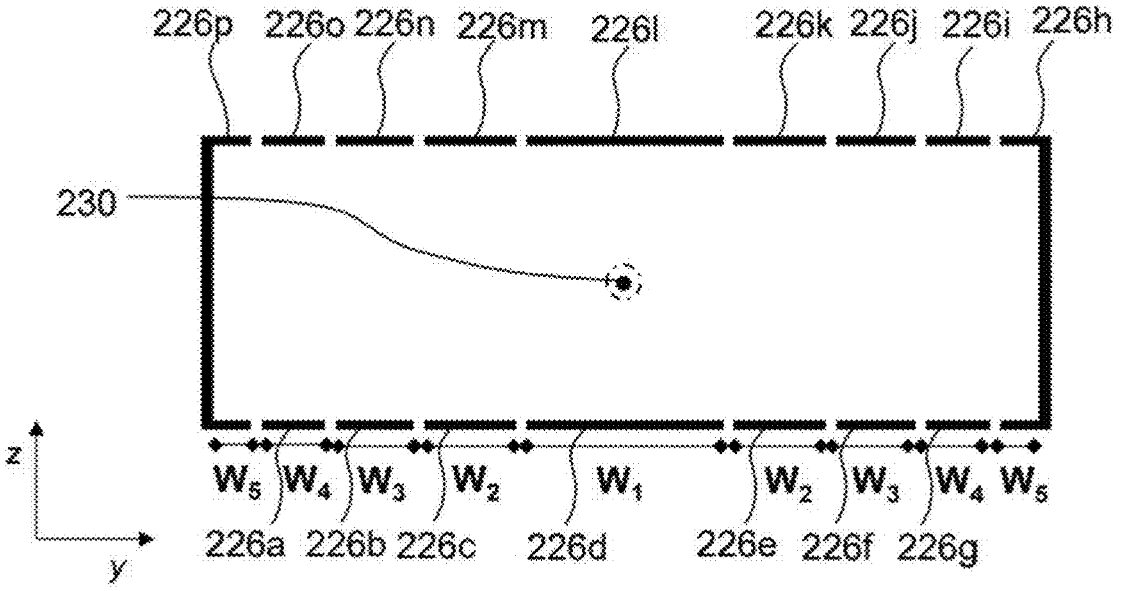
FIG. 8 shows a first example of an arrangement of electrodes in the quadrupole ion optical device.

FIG. 8 shows a schematic cross-sectional view through the housing 228 and the electrodes 226*a-p* of the quadrupole ion optical device 224 of FIG. 7, such that FIG. 8 depicts the y-z plane normal to the central axis 230. It can be seen that the widest electrodes 226*d*, 2261 are arranged having the smallest spacing from the central axis 230, with increasingly narrower electrodes adjacent and to the sides of these widest electrodes 226*d*, 226*l*. The specific width and spacing of the electrodes and their relative arrangement will change the shape of the quadrupole potential. This in turn changes the size and shape of the area around a saddle point which experiences a variance from an ideal quadrupole potential such that the variance in the area is below a threshold amount. For instance, the threshold amount may be a root mean squared value of 0.003 or less.

In one specific example, which is not intended to be limiting, the widths of the electrodes labelled according to FIG. 8 are:

$W_1$=60.0 mm $W_2$=28.5 mm $W_3$=25.5 mm $W_4$=22.0 mm $W_5$=14.0 mm

This configuration, having central electrodes 226*d*, 2261 of greater width than adjoining electrodes, tends to provide a large area (in the y-z plane) having relatively small variance in the electric potential from an ideal quadrupole potential around a saddle point generated at the location of the central axis 230 in the plane (which is the geometric centre of the region bounded by the electrodes 226*a-p*). This is compared to the size of the area having the same levels of variance around a saddle point generated at a location displaced from the location of the central axis 230, in which case the area is smaller. In other words, the example configuration of electrodes 226*a-p* shown in FIG. 8 are optimised for a saddle point at the location of the central axis 230 (i.e, the geometric centre).

As discussed above, different sets of voltages can be applied to the plurality of electrodes 226*a-p* in order to change the shape of the quadrupole potential and in particular to adjust the position of the saddle point of the quadrupole potential. The voltages can be applied in various ways. In one example, a first and a second set of voltages can be applied by use of a first and a second voltage divider arrangement. Voltage dividers can be used as a straightforward method for application of different voltages, because each voltage divider arrangement uses a fixed set of resistors between different pairs of electrodes. Therefore, two or more fixed voltage divider arrangements can be configured connected to a plurality of electrodes of a quadrupole ion optical device, and a voltage supply may be switchably connected to a particular voltage divider arrangement (or a particular voltage divider arrangement can be switchable connected to the electrodes) to select the set of voltages to be applied. The voltage divider arrangements can be defined on a printed circuit board to allow compact electrical circuitry for connection with the electrodes.

Figure 9A:
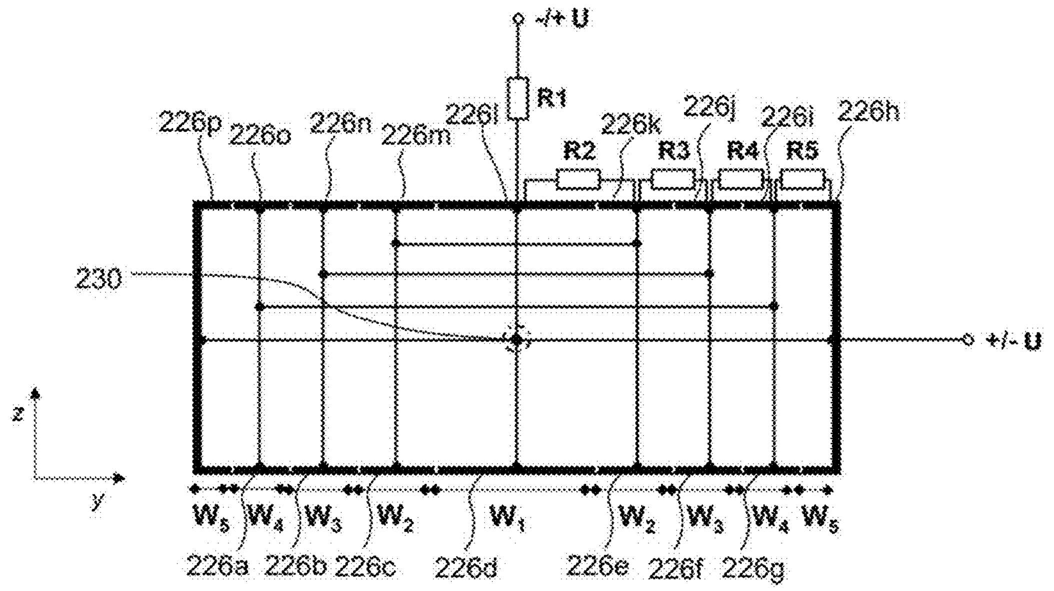
FIG. 9A shows the first voltage divider arrangement.

FIG. 9A shows a first voltage divider arrangement connected to the plurality of electrodes discussed with reference to FIG. 8. FIG. 9A depicts a cross-section of the quadrupole ion optical device in the plane normal to the central axis 230 (being the y-z plane). The first voltage divider arrangement shown in FIG. 9A is for applying a first set of voltages to the plurality of electrodes 226*a-p*. It will be seen that different resistors are arranged between adjacent pairs of electrodes. The electrical circuitry is such that the voltages would be applied symmetrically with respect to the central electrodes 226*d*, 2261 (in other words, symmetrically on either side of the central electrodes). In one example, which is not intended to be limiting, the resistances for the resistors of the voltage divider arrangement shown in FIG. 9A are:

$R_1$=2709 kΩ
$R_2$=362 kΩ
$R_3$=648 kΩ
$R_4$=768 kΩ
$R_5$=1233 kΩ

Figure 9B:
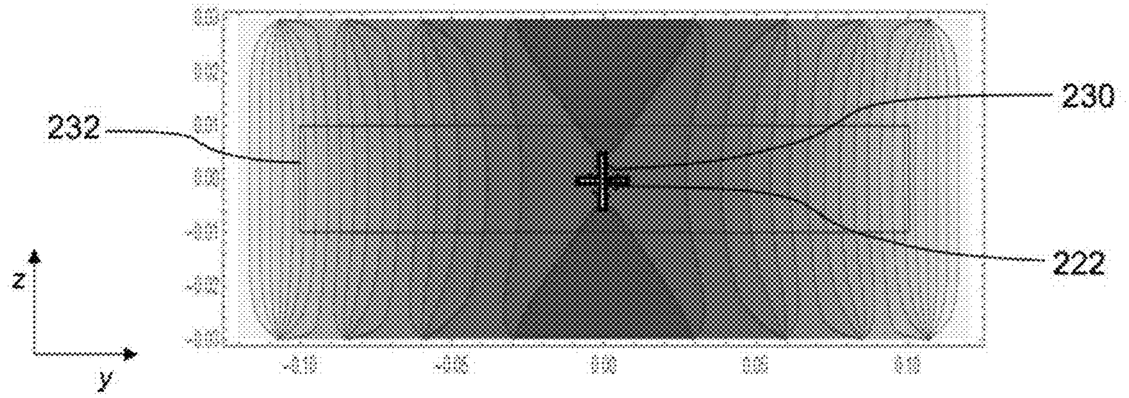
FIG. 9B shows lines of equipotential in the quadrupole potential generated when the first set of voltages are applied.

FIG. 9B shows equipotential lines of the electric potential generated inside the quadrupole ion optical device having the electrodes of FIG. 8 and with the voltages applied to electrodes via the voltage divider arrangement of FIG. 9A. FIG. 9B depicts a cross-section of the quadrupole potential in the plane normal to the central axis 230 (being the y-z plane). Here, the saddle point 222 of the quadrupole potential coincides with the central axis 230 (or geometric centre) of the area bounded by the electrodes 226*a-p*. A rectangular box 232 shown in FIG. 9B surrounding the saddle point indicates a region in which the relative deviation of the electric potential from the potential of an ideal quadrupole is, by way of example, less than 0.2% (being 0.0016 root mean squared (RMS) deviation over the whole region). Preferably, all of the plurality of ion beams will travel through this region of the quadrupole potential.

Figure 9C:
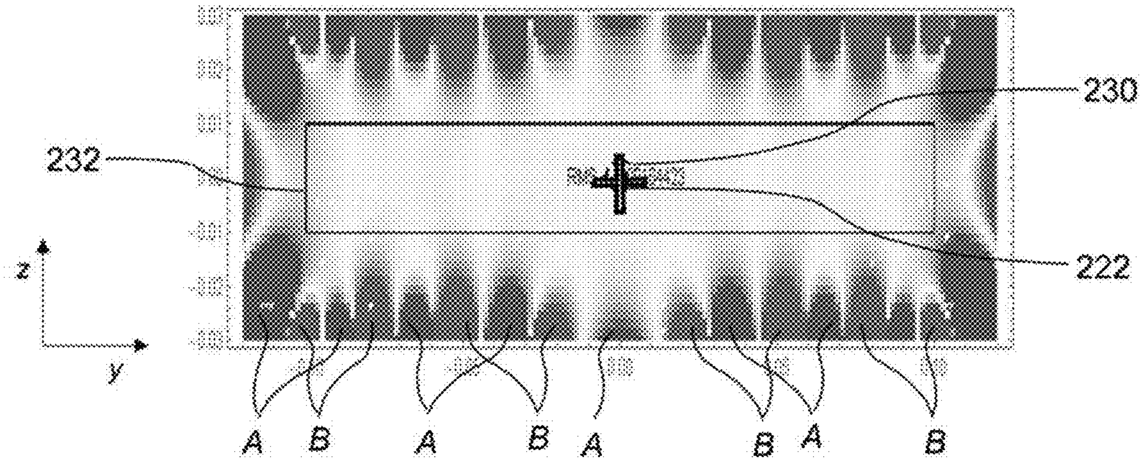
FIG. 9C shows the variance of the electric potential than compared to an ideal quadrupole potential, in an area bounded by the electrodes.

This region is further illustrated in FIG. 9C, which shows the variance of the electric potential compared to an ideal quadrupole potential in the area bounded by the electrodes 226*a-p*. In FIG. 9C, regions labelled A indicate regions where the electric potential deviates by more than-1% from an ideal quadrupole potential and regions labelled B indicate regions where the electric potential deviates by more than +1% from an ideal quadrupole potential. It can be seen that the regions A and B are at the edge of the quadrupole potential, and alternate around the perimeter.

Figure 10A:
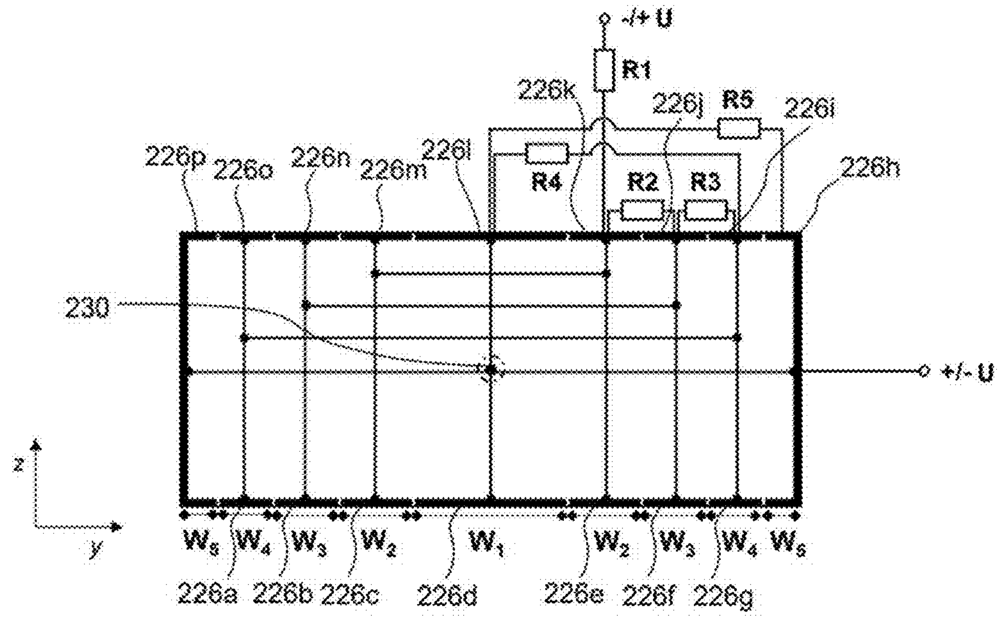
FIG. 10A shows the second voltage divider arrangement.

To move the saddle point of the quadrupole potential compared to that shown in FIG. 9B, a second set of voltages can be applied to the electrodes 226*a-p* of the same quadrupole ion optical device. FIG. 10A shows a second voltage divider arrangement, having a second set of resistors arranged between pairs of electrodes of the plurality of electrodes 226*a-p* that were shown in FIG. 8. FIG. 10A depicts a cross-section of the quadrupole ion optical device in the plane normal to the central axis 230 (being the y-z plane). The second voltage divider arrangement can be used to apply the second set of voltages. As a specific, non-limiting example, values for the resistors shown in the voltage divider arrangement of FIG. 10A may be:

$R_1$=1410 kΩ
$R_2$=187 kΩ
$R_3$=2400 kΩ
$R_4$=140 kΩ
$R_5$=407 kΩ

In this example, the saddle point of the quadrupole potential is shifted away from the central axis 230 (geometric centre) of the area bounded by the electrodes 226*a-p*. Instead, two, symmetric saddle points are generated in the quadrupole potential at a distance to the left and the right of the central axis 230. Typically, ion beams would be expected to pass through the area around only one of the two saddle points in the quadrupole potential.

Figure 10B:
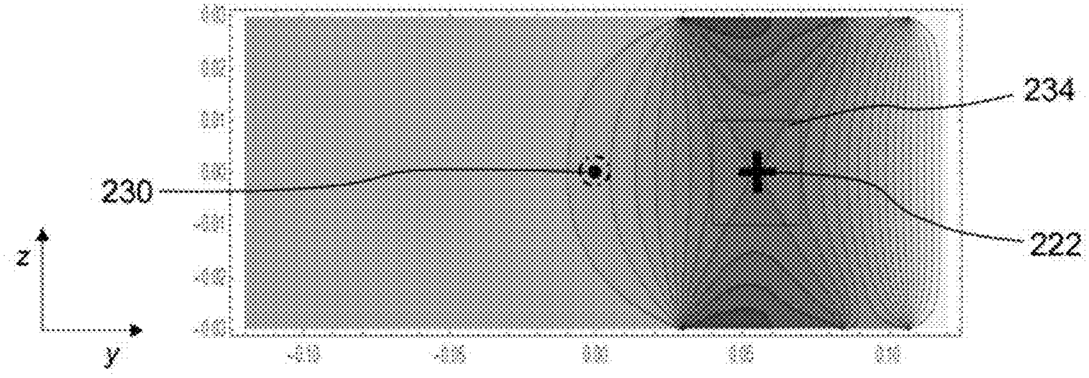
FIG. 10B shows lines of equipotential in the quadrupole potential generated when the second set of voltages are applied.

FIG. 10B shows lines of equipotential for the quadrupole potential generated via the second voltage divider arrangement (although note that the quadrupole potential surrounding only one of the saddle points is simulated in FIG. 10B, even though both saddle points would be generated in practice). FIG. 10B depicts a cross-section of the quadrupole potential in the plane normal to the central axis 230 (being the y-z plane). A box 234 in FIG. 10B shows a region surrounding the saddle point in which the relative deviation of the electric potential from the potential of an ideal quadrupole is less than 1.2%. This region (box 234) is much smaller than the corresponding region (box 232) under the application of the first set of voltages. In addition, the relative deviation of the electric potential compared to the ideal quadrupole potential is also lower upon application of the second set of voltages than the first set of voltages. This is because of the arrangement of the electrodes 226*a-p*, which is optimised for the situation in which the saddle point is located at the central axis 230 (geometric centre) of the area bounded by the electrodes 226*a-p*.

Figure 10C:
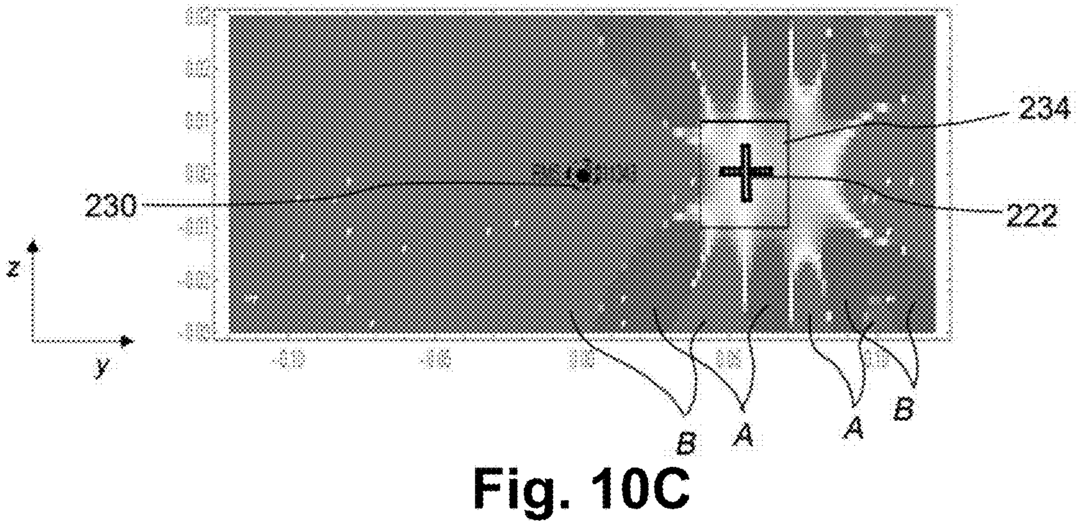
FIG. 10C shows the variance of the electric potential than compared to an ideal quadrupole potential, in an area bounded by the electrodes.

The region in which the relative deviation of the electric potential from the potential of an ideal quadrupole is less than 1.2% is also marked by a rectangular box 234 in FIG. 10C, which shows the deviation from an ideal quadrupole potential in the area bounded by the electrodes. Regions A in FIG. 10C indicate regions where the electric potential deviates by more than-3% from an ideal quadrupole potential, and regions B indicate regions where the electric potential deviates by more than +3% from an ideal quadrupole potential.

Where a first and second voltage divider arrangement (as shown in FIGS. 9A and 10A are used to apply a first and a second set of voltages to the plurality of electrodes 226*a-p*, a switch (not shown) may be used to selectively connect either the first or second voltage divider arrangement to a voltage supply.

In some examples, further voltage divider arrangements may be provided to apply further sets of voltages respectively in order to provide an option to select form a still further location for the saddle point in the quadrupole potential. In this case, a switch may be used to connect the voltage supply to any available voltage divider arrangement. Each voltage divider arrangement will be associated with a particular position of the saddle point of the quadrupole potential, and so the location of the saddle point can be chosen by a user of the mass spectrometer (or a controller for the mass spectrometer) in order to provide the best alignment of the plurality of ion beams into respective detector elements.

It will be understood that different arrangements and sizes of electrodes, as well as applied voltages, can be designed to provide both a particular position of the saddle point of the quadrupole potential and to optimise the size of the region of low variance compared to an ideal quadrupole potential. Overall, providing more control for the voltages applied to each electrode allows for more adaptation of the shape and position of the quadrupole potential. More refined control could be provided, for example, by application of individually programmable voltages supplies to each electrodes, rather than provision of specific voltage dividers arrangements connected to the electrodes. Use of individually programmable voltages supplies permits application of almost any set of voltages, to move the saddle point according to the requirements of a particular measurement. In addition, increasing the number of electrodes within the quadrupole ion optical device will increase the ability to refine the shape of the generated quadrupole potential (by providing a greater 'resolution' for the shape of the electric potential). Nevertheless, providing more controllable voltages supplies and/or more electrodes will increase the cost and complexity of the quadrupole ion optical device. As such, the requirements for the quality and controllability of the quadrupole potential must be balanced with the cost and complexity of the quadrupole ion optical device.

Further examples of the quadrupole ion optical device will be discussed below. FIG. 11 shows the configuration of electrodes 326*a-p* around a central axis 330 for a quadrupole ion optical device optimised to have a more equal area of below threshold variance from ideal quadrupole potential for two different positions of the saddle point of the generated quadrupole potential. In this example, the electrode widths are optimized both for a saddle point of the quadrupole potential coinciding with the central axis 330 (geometric centre) between the electrodes 326*a-p* and also a saddle point displaced from the central axis 330. It can be seen that the layout of the electrodes 326*a-p* includes wider electrodes 326*d*, 3261 at the centre and also wider electrodes 326*b*, 326*f*, 326*j*, 326*n* at a point displaced from the centre. The electrical circuitry is arranged to apply equal voltage to pairs of electrodes symmetrically across the central wider electrodes 326*d*, 326*l*.

Figure 11A:
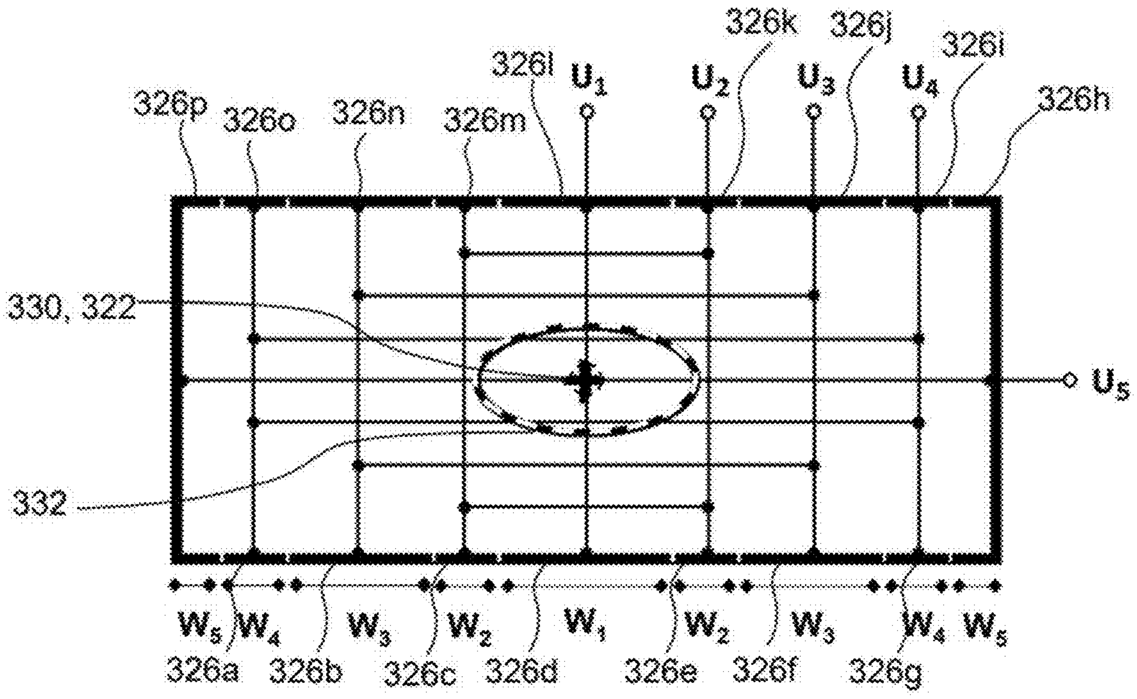
FIG. 11A shows a position of the saddle point and the region of low variance of the quadrupole potential upon application of a first set of voltages.

When a first set of voltages is applied to the electrodes 326*a-p* in FIGS. 11, the saddle point 322 of the quadrupole potential is generated at the location of the central axis 330 (the geometric centre) of the region bounded by the electrodes and in the plane normal to the central axis 330 (as shown in FIG. 11A). A region 332 surrounding the saddle point 322 in which the relative deviation of the electric potential from the potential of an ideal quadrupole is less than a threshold value, such as 0.2%, is schematically denoted by the dotted oval in FIG. 11A.

Figure 11B:
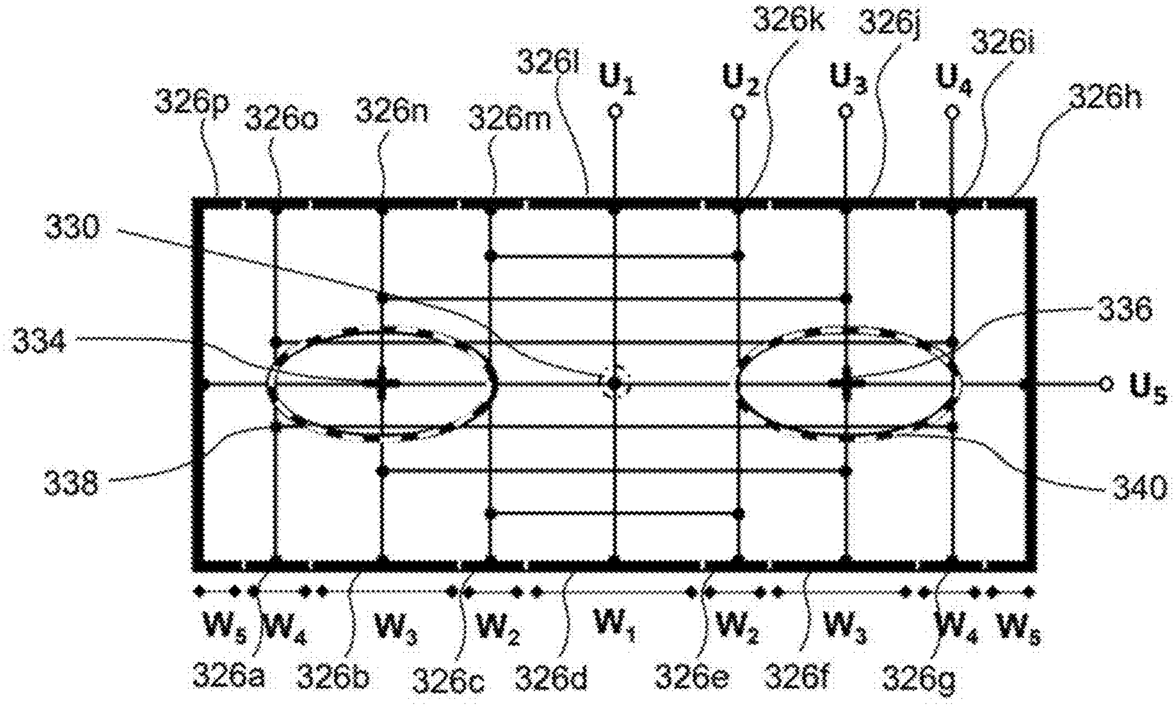
FIG. 11B shows a position of the saddle point and the region of low variance of the quadrupole potential upon application of a second set of voltages.

When a second set of voltages is applied to the electrodes 326*a-p* in FIGS. 11, two saddle points 334, 336 are generated at a location symmetrically displaced from the central axis 330, as shown in FIG. 11B. Two saddle points 334, 336 are generated in this example because of the symmetry of the electrical circuitry. Again, a region 338, 340 surrounding each saddle point 334, 336 in which the relative deviation of the electric potential from the potential of an ideal quadrupole is less than a threshold value, such as 0.2%, is schematically denoted by the dotted oval in FIG. 11B.

It can be seen that the size of the oval regions 332, 338, 340 in FIGS. 11A and 11B are more equal than the rectangular regions 232, 234 of FIGS. 9B and 10B. This is due to the configuration (size, spacing and arrangement) of the electrodes of the given quadrupole ion optical device. The example embodiment of FIG. 11 represents a compromise to the shape of the quadrupole potential under the first set of voltages compared to the second set of voltages. The region 332 of low variance in the quadrupole potential in FIG. 11A is smaller than compared to the region 232 of low variance in the quadrupole potential in the example in FIG. 9B, but the corresponding regions 338, 340 are larger in FIG. 11B than compared to the same region 234 in the example of FIG. 10B.

A still further example configuration for the quadrupole ion optical device is shown in FIG. 12. FIG. 12 shows an arrangement of electrodes 426*a-p* identical to the example of FIG. 8. This arrangement of electrodes 426*a-p* is optimised for the situation when the saddle point 422 of the quadrupole potential coincides with the location of the central axis 430 of an area bounded by the electrodes. However, in this case, the horizontal symmetry of the electrical circuitry is abandoned, allowing different voltages to be applied to electrodes either side of the central axis separately. This has the advantage that only a single saddle point can be generated when a second set of voltages is applied to move the saddle point away from the central axis (i.e, the geometric centre). However, it also increases the complexity of the electrical circuitry.

Figure 12A:
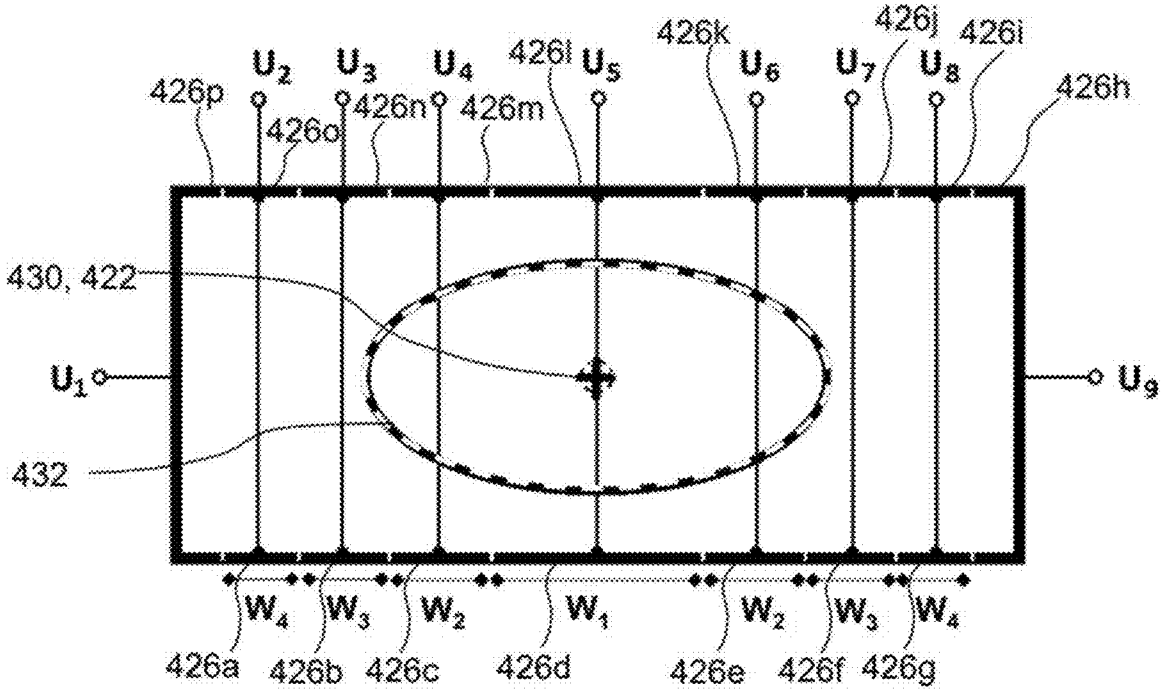
FIG. 12A shows a position of the saddle point and the region of low variance of the quadrupole potential upon application of a first set of voltages.
Figure 12B:
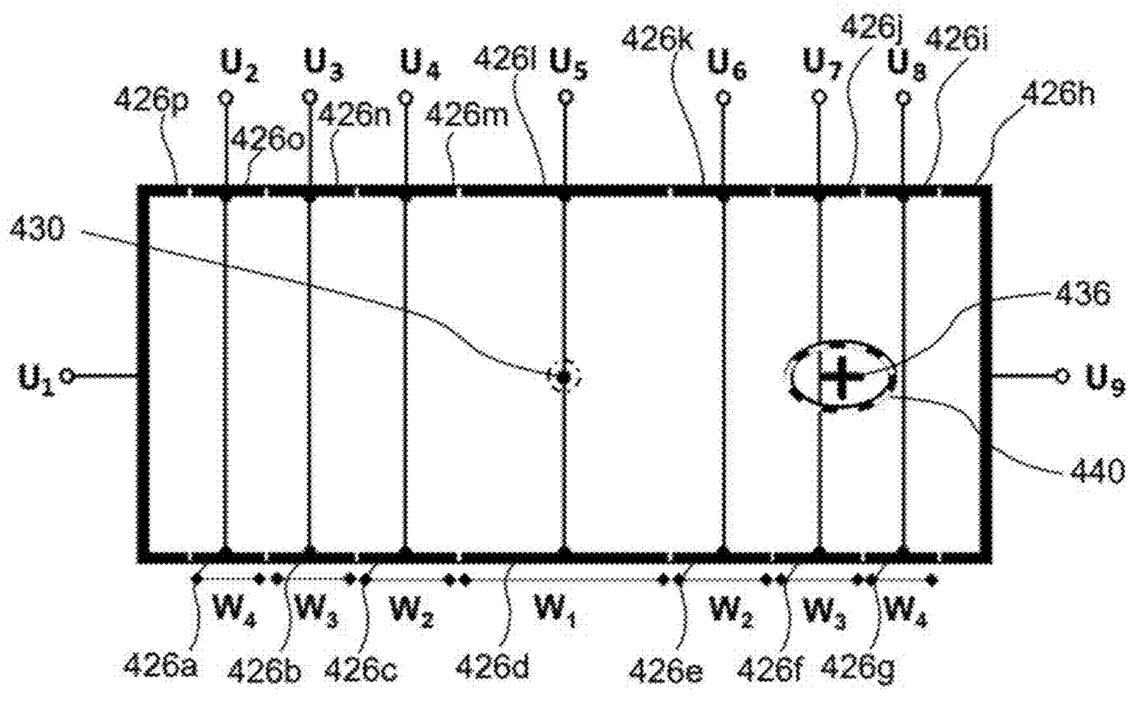
FIG. 12B shows a position of the saddle point and the region of low variance of the quadrupole potential upon application of a second set of voltages.

When a first set of voltages is applied to the electrodes 426*a-p* of the quadrupole ion optical device shown in FIG. 12, the saddle point 422 of the quadrupole potential aligns with the location of the central axis 430 (the geometric centre of the region between the electrodes, see FIG. 12A). A region 432 surrounding the saddle point 422 and having a deviation of less than a threshold value from the potential of an ideal quadrupole is relatively large (and similar to the corresponding region illustrated in FIG. 9B). When a second set of voltages are applied to the electrodes, the saddle point 436 of the quadrupole potential can be moved away from the location of the central axis 430, in the same way as described above in the example of FIG. 10B. However, in this case only one saddle point 436 is generated, as shown in FIG. 12B, by application of appropriate and different voltages to each of the different electrodes 426*a-p*. A region 440 surrounding the saddle point 436 and having a deviation of less than a threshold value from the potential of an ideal quadrupole is small relative to the corresponding region 432 under application of the first set of voltages.

Beneficially, the configuration for the electrical circuitry in FIG. 12 allows the saddle point of the quadrupole potential to be moved either to be better aligned with "high mass" ion beams or with "low mass" ion beams exiting from the mass analyser and passing through the quadrupole ion optical device. This configuration would, for example, allow for deflection of ion beams on the "low mass" side of the quadrupole ion optical device while at the same time not affecting ion beams on the "high mass" side of the quadrupole.

A still further example for the configuration of the quadrupole ion optical device can be envisaged which incorporates aspects of the embodiment in FIG. 11 and FIG. 12. In particular, the horizontal symmetry of the electrical circuitry could be abandoned from the electrode configuration of FIG. 11 (so that separate voltage supplies are connected to each electrode 326*a-p* of the configuration of FIG. 11), in the same way as shown in FIG. 12. This would provide a quadrupole ion optical device that is designed to provide a more equally sized region having deviation less than a threshold amount from the potential of an ideal quadrupole around a saddle point in two different positions, but without also necessarily generating two saddle points symmetrically around the geometric centre upon application of a second set of voltages, as shown in FIG. 11B.

As noted above, ideally, and notwithstanding the inevitable added complexity in the electronic circuitry, the best possible configuration for a quadrupole ion optical device according to the present disclosure can be provided by increasing the number of electrodes and providing a dedicated and independently controlled voltage supply to each of the electrodes. This will give maximum flexibility for the position of a saddle point in the quadrupole potential. Furthermore, increasing the number of voltages will add "resolution" to the quadrupole ion optical device analogous to an increasing number of pixels adding resolution to a computer monitor. This allows the shape of the quadrupole potential to be adapted to provide the largest possible region of below threshold deviation from the potential of an ideal quadrupole around a saddle point. In a still further example, with a large enough number of independently controlled electrodes, two (or more) quadrupole potentials may be generated at the same time with their respective saddle points positioned anywhere with respect to the geometric centre. This would allow for deflection of two or more groups of ion beams with respective deflections individually adjustable for each group of ions.

Figure 13A:
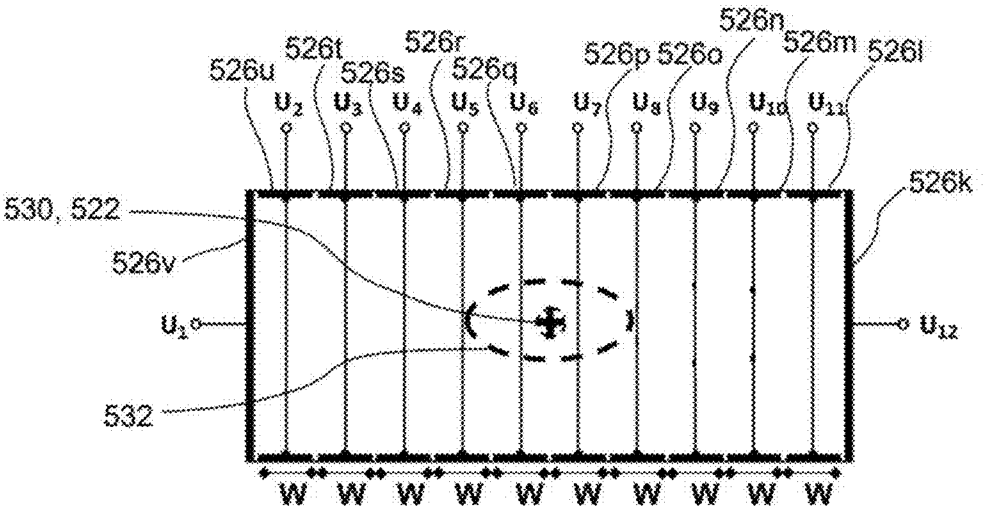
FIG. 13A shows a position of the saddle point and the region of low variance of the quadrupole potential upon application of a first set of voltages.
Figure 13B:
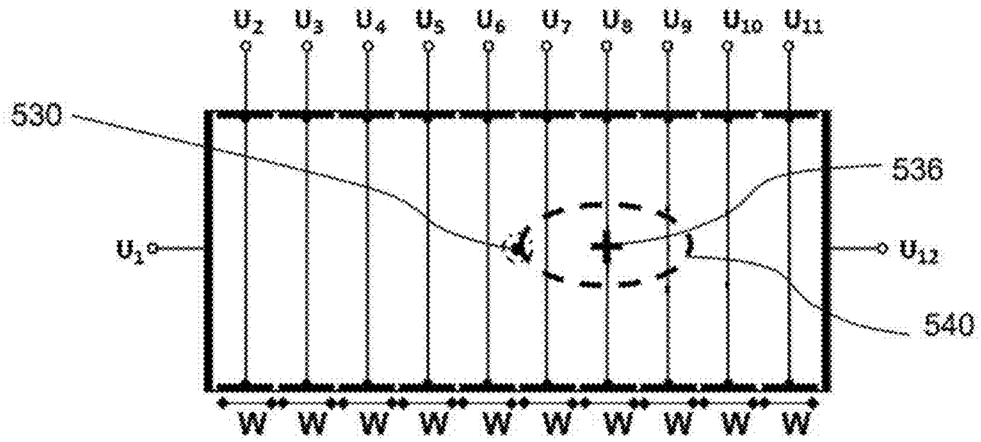
FIG. 13B shows a position of the saddle point and the region of low variance of the quadrupole potential upon application of a second set of voltages.
Figure 13C:
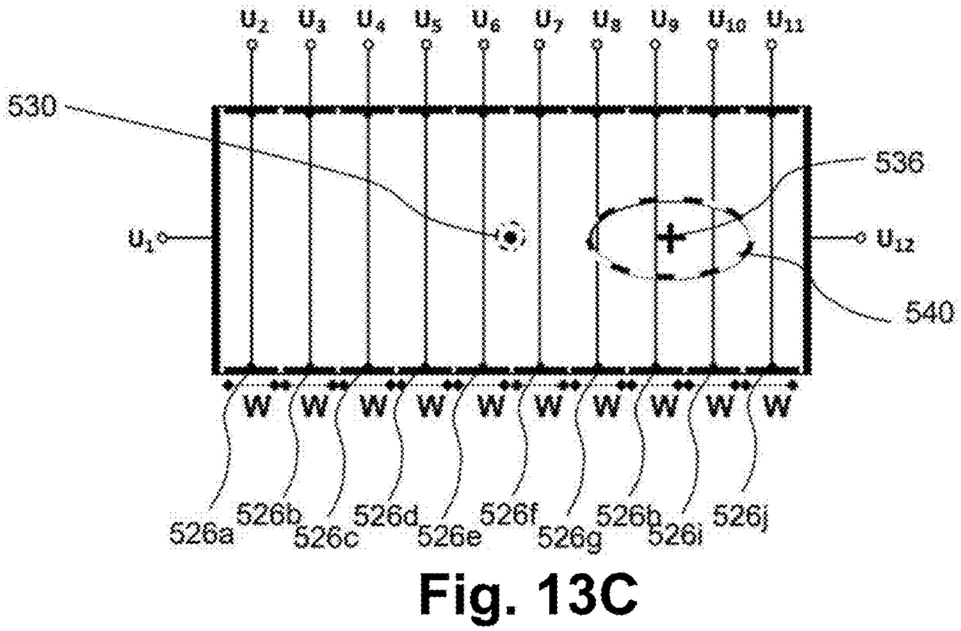
FIG. 13C shows a position of the saddle point and the region of low variance of the quadrupole potential upon application of a third set of voltages.

A still further example of an advantageous configuration for a quadrupole ion optical device is shown in FIG. 13. Here, the quadrupole ion optical device has twenty-four separate electrodes 526*a-v*, each of uniform dimensions and which are equally spaced. Pairs of opposing electrodes are connected to an independently controllable voltage supply. Each electrode of the pairs of electrodes are arranged around a central axis 530 and around the perimeter of the area in which the quadrupole potential is generated. The arrangement of electrodes 526*a-v* in FIG. 13 does not inherently favour any particular location for the saddle point of the quadrupole potential, and may be used to generate a variety of different quadrupole potentials each having a saddle point at a different location. FIGS. 13A, 13B and 13C show three different positions 540, 542, 544 for the saddle point of the quadrupole potential, when three different set of voltages are applied to the electrodes. In each case, the region 546, 548, 550 around the saddle point of below threshold deviation from the potential of an ideal quadrupole is approximately the same size.

For avoidance of doubt, It will be understood that the ovals in FIGS. 11, 12 and 13 designate an area for illustrative purposes only, and do not necessarily represent the true shape of such a region in a quadrupole ion optical device in practice.

Still further examples for the configuration of the quadrupole ion optical device can be envisaged. In particular, the area in which the quadrupole potential is generated, being an area defined in a plane through the quadrupole potential (specifically, a plane orthogonal to the central axis of the quadrupole ion optical device) and bordered by the plurality of electrodes, is not necessarily a rectangular area. Almost any shape for the area of the quadrupole potential could be used with an appropriate arrangement of the plurality of electrodes. The principles for movement of the saddle point of the quadrupole potential by adjustment of the voltages applied to the plurality of electrodes would still apply.

Figure 14A:
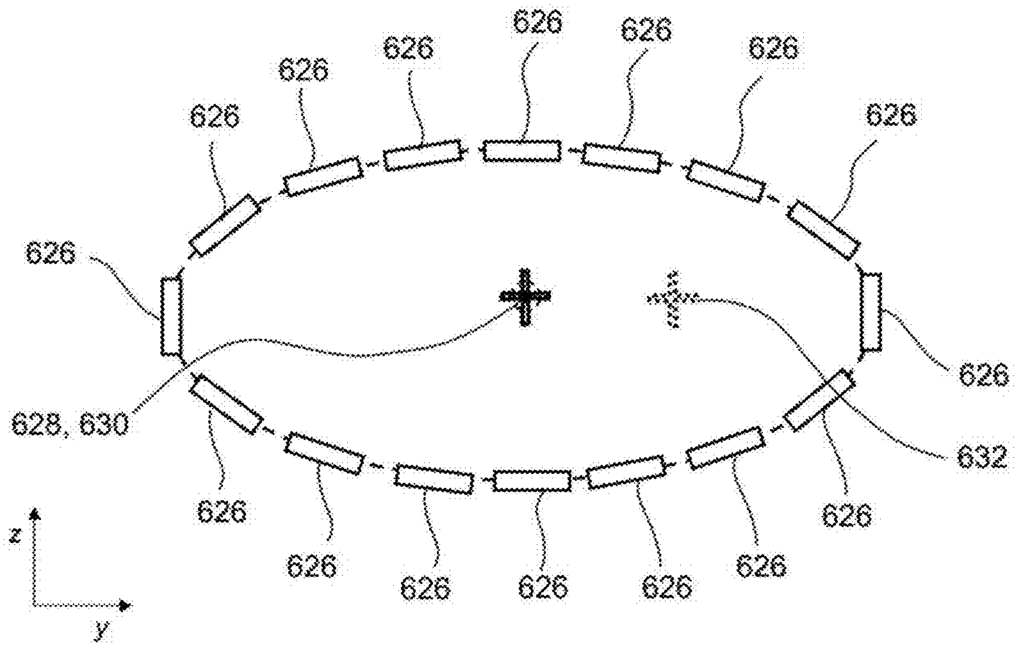
FIG. 14A shows a further example of the possible arrangements of electrodes for a quadrupole ion optical device according to the present disclosure.

The area in which the quadrupole potential is generated and which is bordered by the plurality of electrodes may be, for instance, an oval (as shown in FIG. 14*a*, having electrodes 626 bounding the area and around a central axis 630, a saddle point 628 upon application of a first set of voltages, and a saddle point 632 upon application of a second set of voltages). The area may be any type of irregular polygon. When an irregular polygon is used, then the displacement of the saddle point of the quadrupole potential may be substantially in the longer axis of the irregular polygon.

Figure 14B:
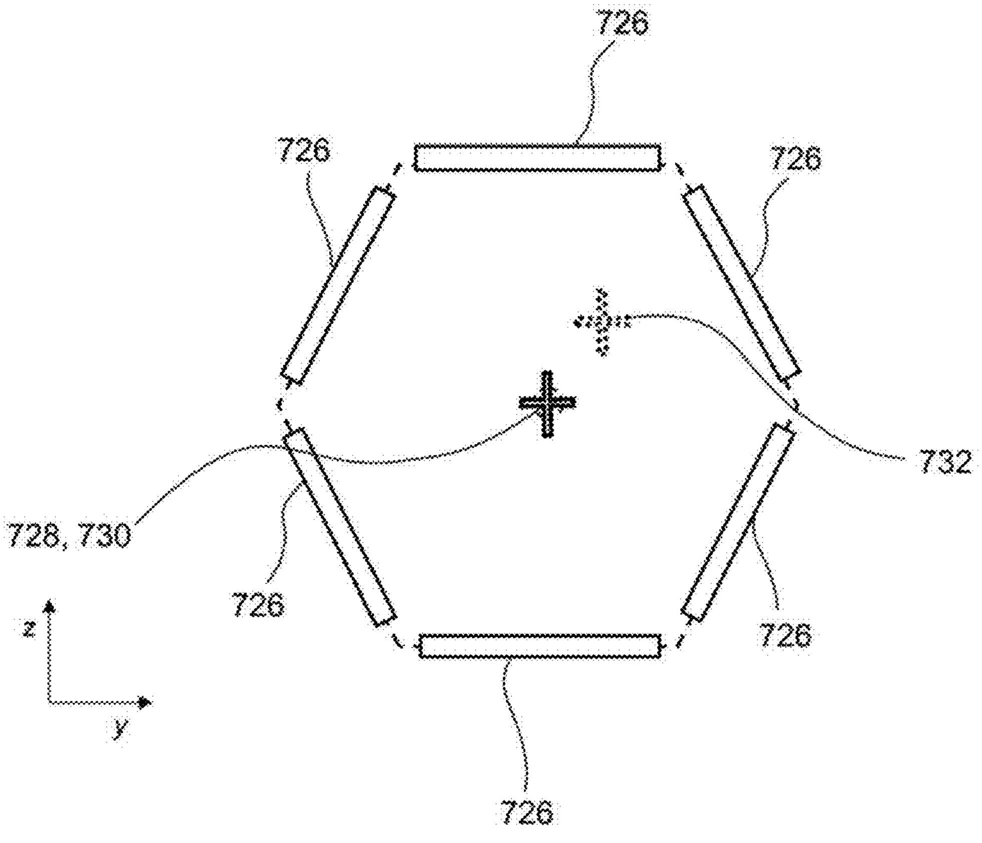
FIG. 14B shows a further example of the possible arrangements of electrodes for a quadrupole ion optical device according to the present disclosure.

In alternatives, the area may be a regular polygon, such as an octagon or a hexagon (as shown in FIG. 14B having electrodes 726 arranged around a central axis 730 and bounding the area, a saddle point 728 upon application of a first set of voltages, and a saddle point 732 upon application of a second set of voltages). In these cases, the saddle point may be displaced from the geometric centre by application of suitable voltages to each electrode.

In still further examples, any of the described arrangements of electrodes and applied voltages for the quadrupole ion optical device may allow the length of the quadrupole potential (in the direction of transmission of the ion beam) to be varied compared to the geometric centre. For instance, appropriate configuration and dimensions for the electrodes may permit an ion beam at the "low mass" side of the laterally spaced ion beams to travel further through a quadrupole potential than an ion beam at the "high mass" side. This will change the extent of deflection undergone by each beam.

Figure 15A:
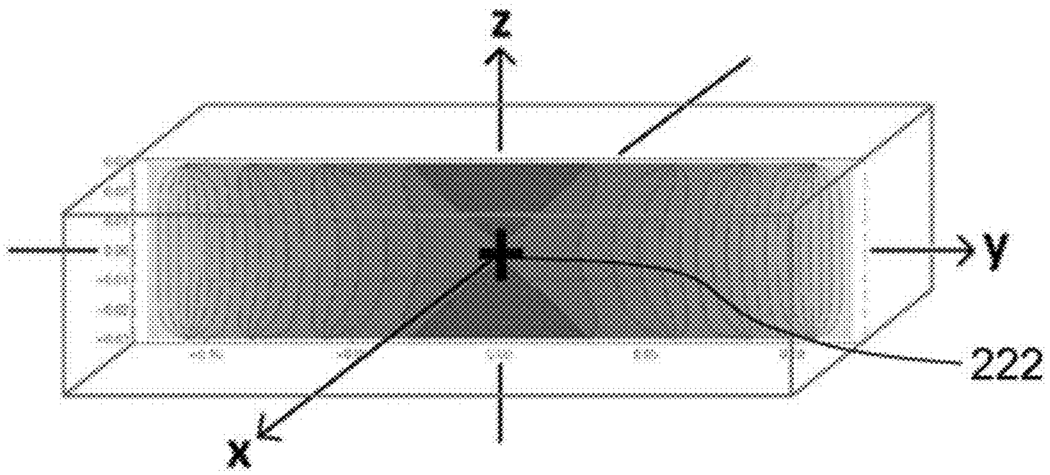
FIG. 15A shows the quadrupole potential with respect to the three dimensions xyz.
Figure 15B:
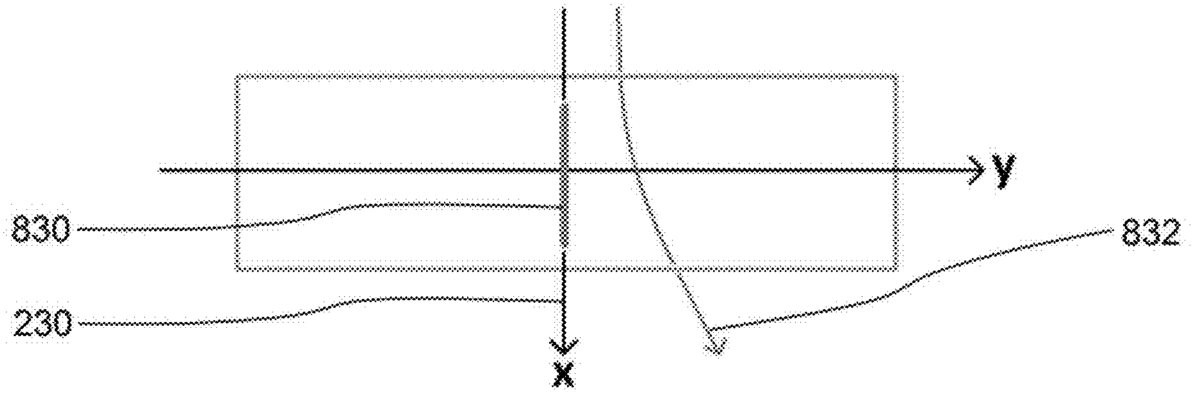
FIG. 15B shows the effect of the quadrupole potential in the x-axis on ion beams passing therethrough.

It will be understood that the saddle point of the quadrupole potential, as described above, is considered as a saddle point in a two-dimensional potential. In other words, the saddle point of the quadrupole potential as shown in FIG. 15A is neither a minimum nor a maximum. Rather, in the orientation shown in FIG. 15A, the quadrupole potential with respect to the saddle point location curves up in a y-direction and curves down in a z-direction (or vice versa). However, in reality the actual quadrupole ion optical device is a three-dimensional structure also extending in the x-direction, where the x-direction is aligned with the central axis around which the plurality of electrodes are arranged (as shown in FIG. 15B). At the mid-point of the x-axis extending through the quadrupole ion optical device, the two-dimensional quadrupole potential in the y-z plane would be the same as seen in FIG. 15A. However, on the boundaries of the quadrupole potential on the x-axis (being the entrance and exit to the quadrupole ion optical device), there are fringing fields representing a transition from the quadrupole field in the y-z plane to zero field outside of the quadrupole ion optical device.

Figure 15C:
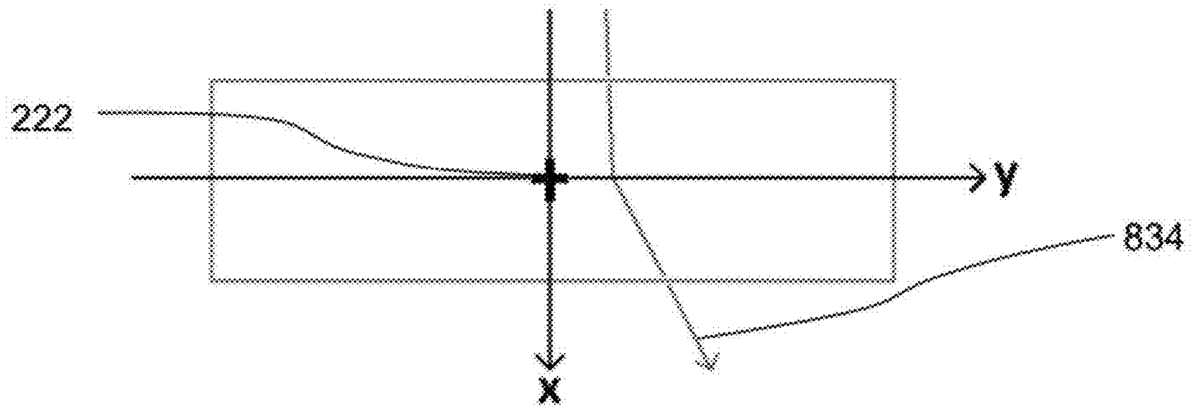
FIG. 15C shows the thin-lens approximation for the effect of the quadrupole potential in the x-axis on ion beams passing therethrough.

In view of the orientation of the quadrupole field generated in the quadrupole ion optical device described, if looking down on the x-y plane of the quadrupole ion optical device then the saddle point of the quadrupole potential (defined in y- and z-direction) also stretches in the x-direction ((in the region shown as a bold line 830 on the x-axis (here aligned with central axis 230) in FIG. 15C). The action of the quadrupole ion optical device on an ion beam 832 that is spaced apart from the saddle point of the quadrupole potential causes a gradual deflection as the ion beam moves further in the x-direction through the quadrupole field. Nevertheless, it will be understood that to simplify the representations of the effects of the quadrupole ion optical device the quadrupole potential can be considered to be limited to a single plane perpendicular to the x-axis (rather than stretching over a region with finite length in the x-direction). This is a commonly used approach in optics known as the thin lens approximation and represented in FIG. 15C. In this approximation, the saddle point 222 of the two-dimensional quadrupole potential may be indicated by a single cross when looking at the quadrupole ion optical device in the x-y plane, and the ion beam 834 that is spaced apart from the saddle point of the quadrupole potential is represented as experiencing deflection in a single plane.

In view of the above, it will be understood that the saddle point in the quadrupole potential considered in the present disclosure is a saddle point in the plane normal (or orthogonal to) the central axis around which the plurality of electrodes are arranged. For instance, the plane may bisect the central axis at the mid-point of the region bounded by the plurality of electrodes and in which the quadrupole potential is generated.

Figure 15D:
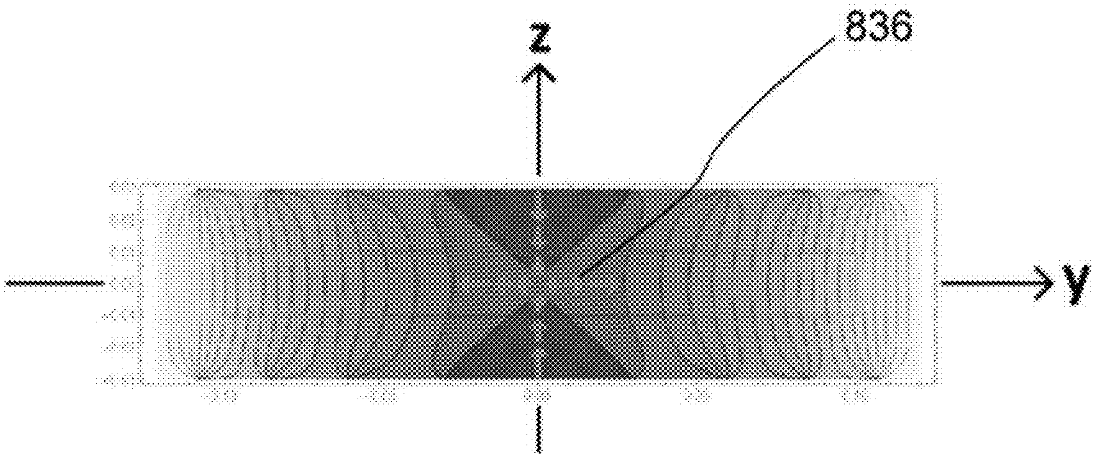
FIG. 15D shows the electric quadrupole field.

Finally, it will be understood that the quadrupole potential gives rise to a quadrupole electric field. The quadrupole electric field is a two-dimensional vector field in the y-z plane, as shown in FIG. 15D. A portion of the electric field is indicated in FIG. 15D by arrows 836. The arrow lengths indicate the strength of the electric field. It will be noted that at the saddle point, the electric field vanishes.

Although specific embodiments have now been described, the skilled person will understand that various modifications and variations are possible. Also, combinations of any specific features shown with reference to one embodiment or with reference to multiple embodiments are also provided, even if that combination has not been explicitly detailed herein.

According to the specific examples described above, this disclosure considers quadrupole ion optical device, for arrangement in a path of each of a plurality of ion beams exiting from a mass analyser towards detector elements of a mass spectrometer, the plurality of ion beams being laterally separated at an exit from the mass analyser, the separation between the plurality of ion beams being proportional to the mass-to-charge ratio of ions in each of the plurality of ion beams, the quadrupole ion optical device comprising:

- a plurality of electrodes, arranged around a central axis and configured to generate a quadrupole potential through which the path of each of the plurality of ion beams can be passed, the application of voltages to the plurality of electrodes generating a quadrupole potential in a region bounded by the plurality of electrodes; and
- electrical circuitry configured to supply at least a first set of voltages or a second set of voltages to the plurality of electrodes, each voltage of the first or second set of voltages to be applied to one or more electrodes of the plurality of electrodes;
- wherein application of the second set of voltages generates a quadrupole potential having a saddle point at a position in a plane normal to the central axis that is displaced compared to a position in a plane normal to the central axis for a saddle point of a quadrupole potential generated upon application of the first set of voltages.

The quadrupole ion optical device may be known as a dispersion quadrupole, although ion beams may be dispersed or focused after passing through the quadrupole potential of the quadrupole ion optical device. The quadrupole ion optical device may also be known as a quadrupole tensor generating device. In other words, the device comprises electrodes having the ability to simulate a quadrupole potential. It will be understood that an appropriate configuration for the plurality of electrodes, as described, instead could be used to simulate a hexapole potential or a multipole potential of another type. A saddle point in said hexapole or multipole potential could be moved to change the deflection of ion beams therethrough. However, typically the ion optical device will simulate a quadrupole potential, in view of the axes of symmetry of a quadrupole potential relative to the spacing of the ion beams as they exit the mass analyser.

The quadrupole potential is an electrostatic quadrupole potential. The saddle point of the quadrupole potential can be considered a stationary point in the electrostatic potential generated between a set of electrodes. The saddle point is a minimax point on the surface of a graph of a function where the slopes (or derivatives) of the function in orthogonal directions are all zero (in other words, a critical point), but which is not a local extremum of the function. An ion beam passing on an axis through the quadrupole potential at a saddle point of the quadrupole potential will experience no deflection.

The quadrupole potential is generated in a region between the electrodes, such that the region has the plurality of electrodes arranged at its perimeter. The electrodes are arranged around a central axis, which is an axis passing directly through the region in which the quadrupole is generated. In some cases, the central axis may coincide with the optical axis of the mass spectrometer, wherein the optical axis is an axis extending between the centre of the exit of the mass analyser and a central detector element of the plurality of detector elements. The central axis may align with the direction of travel of ions in at least one ion beam of the plurality of ion beams. In some cases, each electrode has a longitudinal extension that is arranged parallel to the central axis, so that the plurality of electrodes are arranged at the walls of an open box or housing, having a bore therethrough and through which the central axis passes.

A saddle point in the potential is created in a plane normal to (or orthogonal to) the central axis. It will be understood that a perfect saddle point may not be created in a plane parallel to the central axis, in view of fringing fields at the entry and exit to the quadrupole potential at the entry and exit to the bore through the quadrupole ion optical device.

An ion beam passing through a saddle point in the quadrupole potential, wherein the saddle point is in a plane normal to the central axis, would not undergo deflection, whereas an ion beam passing through the quadrupole potential at a location away from the saddle point will undergo deflection. The extent of the deflection is greater as the distance of the location from the saddle point of the quadrupole potential increases. As such, displacement or shifting of the saddle point of the quadrupole potential allows the saddle point to be moved relative to ion beams passing through a quadrupole potential generated at the quadrupole ion optical device. The saddle point can be arranged to be closer to a central beam of the laterally spaced ion beams of interest, in order to reduce the overall deflection experienced by the ion beams of interest. This could also be seen as optimisation of the location of the saddle point in order to minimise the sum of each of the deflections experienced by each ion beam of interest. This could also be understood as configuring the location of the saddle point so that the extent of the deflection experienced by the particular ion beam of interest that undergoes the greatest amount of deflection compared to the rest of the group is minimised.

The saddle point of the quadrupole potential is displaced in order to cause the ion beams of interest to better align with a respective detector element. Better alignment can include optimising the system to cause each beam to enter a given detector element at an angle closest to normal to the plane of the detector surface of the respective detector element.

The position of the saddle point of the quadrupole potential in a plane normal to the central axis upon application of the first and/or second set of voltages may be displaced from (i.e. may not coincide with) the central axis. The central axis may pass through the geometric centre of the region bounded by the plurality of electrodes. In one example, the position of the saddle point of the quadrupole potential coincides with the central axis upon application of the first set of voltages, whereas the position of the saddle point of the quadrupole potential is displaced from the central axis upon application of the second set of voltages. Typically, a set of voltages that generates a saddle point that is displaced from the central axis will comprise two or more different voltages. In other words, unequal voltages are applied between different pairs of electrodes to cause the saddle point to be generated at a location that is not aligned with the geometric centre of the region bounded by the plurality of electrodes.

The electrodes may be arranged such that, in a plane normal to the central axis, the region bounded by the plurality of electrodes extends further in a first direction than in a second direction, wherein the first and the second direction are orthogonal. The direction of the displacement of the saddle point of the quadrupole potential upon application of the second set of voltages compared to the first set of voltages may be in the first direction. In particular, the first direction may be parallel to the lateral separation of the plurality of the ion beams. In these examples, the spacing between the central axis and each electrode of the plurality of electrodes may be different for different electrodes. The electrodes may be arranged such that, in a plane normal to the central axis, the region bounded by the plurality of electrodes has at least a first and a second axis of symmetry, wherein the first and the second axis of symmetry are orthogonal. In other words, a region or area defined having the electrodes at its boundary (bounded by the plurality of electrodes) may be an irregular polygon (such as a rectangle), or may be an oval.

Alternatively, the electrodes may be arranged such that, in a plane normal to the central axis, the region bounded by the plurality of electrodes may be a regular polygon, such as a square, hexagon or octagon. The area may be a circle. In this case, the spacing between the central axis and each electrode is equal.

The plurality of electrodes may comprise six or more electrodes, or ten or more electrodes. The greater the number of the electrodes, the more control is provided for the position of the saddle point of the quadrupole potential. In other words, a greater number of electrodes provides a greater resolution to the shape of the quadrupole potential. The electrodes are arranged spaced apart from each other. The electrodes may not be equally spaced. Where the region or area bounded by the plurality of electrodes is rectangular, a majority of the electrodes may be arranged on the longer sides of the rectangle.

In a plane normal to the central axis, each of the plurality of electrodes may have an equal width. In some examples, each of the plurality of electrodes may have the same size in every dimension.

In a plane normal to the central axis, at least two of the electrodes of the plurality of electrodes may have a different width, wherein the width of each electrode of the plurality of electrodes may be configured to generate at a first predetermined location the saddle point of the quadrupole potential in a plane normal to the central axis upon application of the first set of voltages, and generate at a second predetermined location the saddle point of the quadrupole potential in a plane normal to the central axis upon application of the second set of voltages. Changing the size and spacing of the electrodes changes the shape of the quadrupole potential that is generated. The size and spacing of the electrodes may be optimised to provide a saddle point at a first location or at a second location in the plane normal to the central axis, depending on the voltages applied to the electrodes.

A size of each electrode of the plurality of electrodes and a spacing between pairs of electrodes of the plurality of electrodes are selected to provide a deviation of the electric potential of less than a threshold value (such as 0.5%) from an ideal quadrupole potential in a first area around the saddle point in a plane normal to the central axis upon application of the first set of voltages; and to provide a deviation of the electric potential of less than the threshold value (such as 0.5%) from the ideal quadrupole potential in a second area around the saddle point in a plane normal to the central axis upon application of the second set of voltages;

wherein the first area is 50% to 150% of the second area.

The deviation of the electric potential from the ideal quadrupole potential may be less than a threshold value, which may be a predetermined percentage. In some cases, the deviation of the electric potential from the ideal quadrupole potential may be less than 0.5%, or less than 0.3%, or less than 0.2%, or even less than 0.1%. In some cases the first area is 70% to 130% of the second area, 80% to 120% of the second area, or even 90% to 110% of the second area. Optionally, the first area may be approximately or substantially the same as the second area.

The deviation of the electric potential from an ideal quadrupole potential describes the quality of the quadrupole potential. The threshold value may represent the root mean squared deviation from an ideal quadrupole potential over the whole region. The size and spacing of the electrodes may be selected so that the size of the area of 'good quality' quadrupole potential (i.e. having a deviation below the threshold value) is sufficient to allow all of the plurality of the ion beams to pass through. Preferably, the size of the area of 'good quality' quadrupole potential will be similar around both the location of the saddle point upon application of the first set of voltages and the location of the saddle point upon application of the second set of voltages.

It will be understood that various methods can be used to apply a voltage to each of the electrodes of the plurality of electrodes. Where only a discrete number of positions or locations are required for the saddle point, then a voltage divider arrangement could be provided to provide voltages suitable for each of the required locations of the saddle point. The different voltage divider arrangements may be selectively connected to a voltage supply by switching relays, to switch the saddle point between different positions. Instead, the different voltage divider arrangements may be selectively connected to the plurality of electrodes by switching relays, to switch the saddle point between different positions. Use of switching relays may require less complex electrical circuitry, and may be a lower cost option. Alternatively, more flexibility in the position of the saddle point is provided by provision of programmable voltage supplies to each electrode individually. For instance, this could be by supply of voltages via different programmable channels of a digital-to-analogue converter. This would provide maximum flexibility in the position of the saddle point and the size of the low variance area within the quadrupole potential, but is typically more complex and more costly to implement.

More specifically, the electrical circuitry may be configured to permit simultaneous supply of a different voltage to each electrode of the plurality of electrodes. For instance, the electrical circuitry may be configured so that each electrode is connected to an individually programable voltage supply. An individually programmable voltage supply may be a channel of a digital-to-analogue converter. Individual control of the voltage applied to each electrode may provide greater control of the position of a saddle point of the quadrupole potential. However, this type of electrical circuitry may be more complex and/or more costly to implement.

Alternatively, the electrical circuitry may comprise a first voltage divider arrangement, a second voltage divider arrangement and one or more voltage supplies;

- wherein the first voltage divider arrangement is configured to supply the first set of voltages when the first voltage divider is electrically coupled to at least one of the one or more voltage supplies and the plurality of electrodes, each voltage of the first set of voltages to be supplied to one or more of the plurality of electrodes; and
- wherein the second voltage divider arrangement is configured to supply the second set of voltages when the second voltage divider is electrically coupled to at least one of the one or more voltage supplies and the plurality of electrodes, each voltage of the second set of voltages to be supplied to one or more of the plurality of electrodes.

Each voltage divider arrangement may be provided to apply a predetermined voltage to each of the electrodes of the plurality of electrodes. The use of voltage divider arrangements provides a straightforward method of providing a first or a second set of voltages to the electrodes, and so may be less complex to implement within the quadrupole ion optical device.

The quadrupole ion optical device may further comprise at least one switching relay to selectively electrically couple either the first voltage divider arrangement or the second voltage divider arrangement to the plurality of electrodes, or to selectively electrically couple at least one of the one or more voltage supplies to either the first voltage divider arrangement or the second voltage divider arrangement. As such, a switch may be provided to selectively connect either the first or the second voltage divider arrangement to the electrodes, and/or to selectively connect at least one of the one or more voltage supplies to the first or the second voltage divider arrangement.

Each of the first and the second voltage divider may comprise a set of resistors, wherein a first resistor of the set of resistors is electrically coupled between a first electrode of the plurality of spaced apart electrodes and at least one of the one or more voltage supplies, and other resistors of the set of resistors is electrically coupled between different pairs of the plurality of spaced apart electrodes. The configuration and/or resistance of the set of resistors comprised by the first voltage divider arrangement is different to the configuration and/or resistance of the set of resistors comprised by the second voltage divider arrangement. Alternatively, each of the resistors of the set of resistors may be a variable resistor.

The electrical circuitry of the quadrupole ion optical device may be configured to supply a third or further set of voltages to the plurality of electrodes. The third or further set of voltages may cause the saddle point in a plane normal to the central axis to be generated at a third or further location, that is different to the location of the saddle point in a plane normal to the central axis generated upon application of the first or second set of voltages.

In one example, the quadrupole ion optical device further comprises a third voltage divider arrangement, wherein the third voltage divider arrangement is configured to generate the quadrupole potential having the saddle point in a plane normal to the central axis in a third position when the third voltage divider arrangement is electrically coupled to at least one of the one or more voltage supplies. The third position is displaced from the first position by a greater distance than the displacement of the second position from the first position. The quadrupole ion optical device may further comprise a switch to selectively electrically couple at least one of the one or more voltage supplies to the first voltage divider arrangement, to the second voltage divider arrangement or to the third voltage divider arrangement, or to selectively electrically couple either the first voltage divider arrangement, the second voltage divider arrangement or the third voltage divider arrangement to the plurality of electrodes.

Each voltage of the first or the second set of voltages (or any further set of voltages) may be a direct current (DC) voltage. In other words, the voltages applied to each of the plurality of electrodes is constant and static, and not alternating.

There is also considered a mass spectrometer, comprising:

- a mass analyser;
- a plurality of detector elements; and
- the quadrupole ion optical device as described above, wherein the quadrupole ion optical device is arranged between the mass analyser and the plurality of detector elements, such that a plurality of ion beams exiting from the mass analyser towards the plurality of detector elements pass through the quadrupole potential generated by the plurality of electrodes at the quadrupole ion optical device. The mass analyser is of a type such that a plurality of ion beams exiting the mass analyser are laterally separated, the separation between the plurality of ion beams being proportional to the mass-to-charge ratio of ions in each of the plurality of ion beams.

The detector elements may be collector elements. For instance, the detector elements may each be a Faraday collector. Each detector element may be arranged to be spaced apart and fixed in position relative to each other.

The central axis of the quadrupole ion optical device is aligned with an optical axis of the mass spectrometer. The optical axis can be defined as an axis extending between the centre of the exit of the mass analyser and a centre detector element of the plurality of detector elements. The central axis may align with the direction of travel of ions in at least one ion beam of the plurality of ion beams.

The plurality of electrodes may be arranged such that in a plane normal to the central axis of the quadrupole ion optical device the region bounded by the plurality of electrodes extends further in the direction of lateral separation of the plurality of ion beams at the exit from the mass analyser than a direction in the same plane that is orthogonal to the direction of lateral separation of the plurality of ion beams at the exit from the mass analyser. The displacement of the position of the saddle point of the quadrupole potential in the plane normal to the central axis upon application of the second set of voltages may be displaced from the position of a saddle point of the quadrupole potential in the plane normal to the central axis upon application of the first set of voltages in the direction of lateral separation of the plurality of ion beams at the exit from the mass analyser. The displacement may be in either the 'high mass' or the 'low mass' direction.

The mass spectrometer may be an isotope ratio mass spectrometer.

Finally, there is disclosed a method of mass spectrometry, comprising:

passing one or more ion beams exiting from a mass analyser through a quadrupole potential generated by a quadrupole ion optical device and towards one or more detector elements;

adjusting the position of a saddle point of the quadrupole potential, to optimise the alignment of each of the one or more ion beams into a respective one of the one or more detector elements.

Optimising the alignment may comprise adjusting the position of the saddle point to minimise the angle of each of the one or more ion beams compared to a direction normal to a detection surface at the respective one of the one or more detector elements at which said ion beam is received. In other words, optimising the alignment may comprise adjusting the position of the saddle point to minimise the sum of each angle of the ion beam compared to a direction orthogonal to the plane of the opening of a detector element (and in particular, a detector element being a collector-type element) at which said ion beam is received.

Adjusting the position of a saddle point may comprise adjusting a voltage applied to at least one electrode of a plurality of electrodes at the quadrupole ion optical device, the plurality of electrodes configured to generate the quadrupole potential.

Voltages may be applied to each electrode of a plurality of electrodes by an individually programable voltage supply. For instance, a voltage may be supplied to each electrode via a channel of a digital-to-analogue controller. In this case, adjusting a voltage applied to at least one electrode of the plurality of electrodes at the quadrupole ion optical device comprises programming the individually programmable voltage supply for each electrode.

Alternatively, adjusting a voltage applied to at least one electrode of the plurality of electrodes at the quadrupole ion optical device may comprise supplying a first set of voltages to the plurality of electrodes via a first voltage divider arrangement, or supplying a second set of voltages to the plurality of electrodes via a second voltage divider arrangement, wherein application of the second set of voltages generates a quadrupole potential having a saddle point at a position that is displaced compared to a position of a saddle point of a quadrupole potential generated upon application of the first set of voltages. In this case, supplying the first set of voltages to the plurality of electrodes via the first voltage divider arrangement or supplying the second set of voltages to the plurality of electrodes via the second voltage divider arrangement may comprise switchably connecting a voltage supply between the first voltage divider arrangement or the second voltage divider arrangement, or switchably connecting the first voltage divider arrangement or the second voltage divider arrangement to the plurality of electrodes.

Any of the features or characteristics of those features described above with respect to the quadrupole ion optical device will apply to the corresponding feature within the mass spectrometer or, as applicable, within the method of mass spectrometry.

The invention claimed is:

1. A quadrupole ion optical device, for arrangement in a path of each of a plurality of ion beams exiting from a mass analyser towards a plurality of detector elements of a mass spectrometer, the plurality of ion beams being laterally separated at an exit from the mass analyser, the separation between the plurality of ion beams being proportional to the massto-charge ratio of ions in each of the plurality of ion beams, the quadrupole ion optical device comprising:

a plurality of electrodes, arranged around a central axis and configured to generate a quadrupole potential through which the path of each of the plurality of ion beams can be passed, an application of voltages to the plurality of electrodes generating a quadrupole potential in a region bounded by the plurality of electrodes; and electrical circuitry configured to supply at least a first set of voltages or a second set of voltages to the plurality of electrodes, each voltage of the first or second set of voltages to be applied to one or more electrodes of the plurality of electrodes;

wherein application of the first set of voltages generates a first quadrupole potential having a saddle point at a first position in a plane normal to the central axis that optimises an alignment of a first group of ion beams of interest, which are included in the plurality of ion beams, into a first respective set of detector elements of the plurality of detector elements by minimising an angle of incidence between each of the ion beams of interest of the first group and a direction normal to a detection surface of the respective detector element of the first set of detector elements at which the ion beam is received;

wherein application of the second set of voltages generates a second quadrupole potential having a saddle point at a second position, different from the first position, in the plane normal to the central axis that optimises an alignment of a second group of ion beams of interest, which are included in the plurality of ion beams, into a second respective set of detector elements of the plurality of detector elements by minimising an angle of incidence between each of the ion beams of interest of the second group and a direction normal to a detection surface of the respective detector element of the second set of detector elements at which the ion beam is received;

wherein the first and second groups of ion beams of interest differ in mass-to-charge ratio and the first and second respective sets of detector elements are oriented at different angles;

wherein the quadrupole ion optical device is configured to provide a continuous flow of the plurality of ion beams from the mass analyser to the plurality of detector elements, without trapping ions within the quadrupole ion optical device.

2. The quadrupole ion optical device of claim 1, wherein the second position of the saddle point of the second quadrupole potential in the plane normal to the central axis upon application of the second set of voltages is displaced from the central axis.

3. The quadrupole ion optical device of claim 1, wherein the plurality of electrodes comprises six or more electrodes.

4. The quadrupole ion optical device of claim 1, wherein the electrodes are arranged such that, in the plane normal to the central axis, the region bounded by the plurality of electrodes extends further in a first direction than in a second direction, wherein the first and the second direction are orthogonal.

5. The quadrupole ion optical device of claim 1, wherein in the plane normal to the central axis each of the plurality of electrodes has an equal width.

6. The quadrupole ion optical device of claim 1, wherein in a plane normal to the central axis at least two of the electrodes of the plurality of electrodes have a different width, wherein the width of each electrode of the plurality of electrodes is configured to generate at a first predetermined location the saddle point of the first quadrupole potential in the plane normal to the central axis upon application of the first set of voltages, and generate at a second predetermined location the saddle point of the second quadrupole potential in the plane normal to the central axis upon application of the second set of voltages.

7. The quadrupole ion optical device of claim 1, wherein a size of each electrode of the plurality of electrodes and a spacing between pairs of electrodes of the plurality of electrodes are selected to provide a deviation of the electric potential of less than a threshold amount from an ideal quadrupole potential in a first area around the saddle point of the first quadrupole potential in a plane normal to the central axis upon application of the first set of voltages; and to provide a deviation of the electric potential of less than a threshold amount from the ideal quadrupole potential in a second area around the saddle point of the second quadrupole potential in the plane normal to the central axis upon application of the second set of voltages;

wherein the first area is 50% to 150% of the second area.

8. The quadrupole ion optical device of claim 1, wherein the electrical circuitry is configured to permit simultaneous supply of a different voltage to each electrode of the plurality of electrodes.

9. The quadrupole ion optical device of claim 1, wherein the electrical circuitry comprises a first voltage divider arrangement, a second voltage divider arrangement and one or more voltage supplies;

wherein the first voltage divider arrangement is configured to supply the first set of voltages when the first voltage divider is electrically coupled to at least one of the one or more voltage supplies and the plurality of electrodes, each voltage of the first set of voltages to be supplied to one or more of the plurality of electrodes; and wherein the second voltage divider arrangement is configured to supply the second set of voltages when the second voltage divider is electrically coupled to at least one of the one or more voltage supplies and the plurality of electrodes, each voltage of the second set of voltages to be supplied to one or more of the plurality of electrodes.

10. The quadrupole ion optical device of claim 9, wherein the electrical circuitry further comprises:

at least one switching relay to selectively electrically couple either the first voltage divider arrangement or the second voltage divider arrangement to the plurality of electrodes, or to selectively electrically couple at least one of the one or more voltage supplies to either the first voltage divider arrangement or the second voltage divider arrangement.

11. The quadrupole ion optical device of claim 1, wherein each voltage of the first or the second set of voltages is a direct current (DC) voltage.

12. A mass spectrometer, comprising:

the mass analyser;

the plurality of detector elements; and the quadrupole ion optical device according to claim 1, wherein the quadrupole ion optical device is arranged between the mass analyser and the plurality of detector elements, such that the plurality of ion beams exiting from the mass analyser towards the plurality of detector elements pass through the quadrupole potential generated by the plurality of electrodes at the quadrupole ion optical device, without ions in the plurality of ion beams being trapped within the quadrupole ion optical device;

wherein the central axis of the quadrupole ion optical device is aligned with a direction of travel of ions in at least one of the plurality of ion beams towards the plurality of detector elements.

13. The mass spectrometer of claim 12, wherein in a plane normal to the central axis of the quadrupole ion optical device the region bounded by the plurality of electrodes extends further in the direction of lateral separation of the plurality of ion beams at the exit from the mass analyser than a direction in the same plane that is orthogonal to the direction of lateral separation of the plurality of ion beams at the exit from the mass analyser.

14. The mass spectrometer of claim 12, wherein the central axis of the quadrupole ion optical device is aligned with an optical axis of the mass spectrometer, the optical axis extending between the centre of the exit of the mass analyser and a detector element among the plurality of detector elements.

15. The mass spectrometer of claim 12, wherein the mass spectrometer is an isotope ratio mass spectrometer.

16. A method of mass spectrometry, comprising:

passing a plurality of ion beams exiting from a mass analyser through a quadrupole potential generated by a quadrupole ion optical device and towards a plurality of detector elements, without trapping ions within the quadrupole ion optical device;

adjusting a position of a saddle point of the quadrupole potential to a first position, to optimise an alignment of a first group of ion beams of interest, which are included in the plurality of ion beams, into a first respective set of detector elements of the plurality of detector elements by minimising an angle of incidence between each of the ion beams of interest of the first group and a direction normal to a detection surface of the respective detector element of the first set of detector elements at which the ion beam is received;

adjusting the position of the saddle point of the quadrupole potential to a second position, to optimise an alignment of a second group of ion beams of interest, which are included in the plurality of ion beams, into a second respective set of detector elements of the plurality of detector elements by minimising an angle of incidence between each of the ion beams of interest of the second group and a direction normal to a detection surface of the respective detector element of the second set of detector elements at which the ion beam is received;

wherein the first and second groups of ion beams of interest differ in mass-to-charge ratio and the first and second respective sets of detector elements are oriented at different angles.

17. The method of claim 16, wherein adjusting the position of the saddle point to the first or second position minimises an overall deflection experienced by the ion beams of interest of the first or second group, respectively, passing through the quadrupole potential generated by the quadrupole ion optical device.

18. The method of claim 16, wherein adjusting the position of the saddle point to the first or second position minimises the sum of the angles between the ion beams of interest of the first or second group, respectively, and the directions normal to the detection surfaces of the respective detector elements or the first or second sets of detector elements, respectively, at which the ion beams of interest are received.

19. The method of claim 16, wherein:

the plurality of ion beams passing through the quadrupole potential are laterally separated from one another in a plane normal to a central axis of the quadrupole ion optical device; and adjusting the position of the saddle point of the quadrupole potential to the first or second position comprises moving the position of the saddle point away from the central axis and along the plane normal to the central axis.

20. The method of claim 19, wherein adjusting the position of the saddle point to the first or second position reduces an angle between the path of one of the ion beams of interest of the first or second group, respectively, and the central axis of the quadrupole ion optical device.

21. The method of claim 16, wherein:

adjusting the position of the saddle point to the first or second position comprises switching from supplying a first set of voltages to supplying a second set of voltages to a plurality of electrodes of the quadrupole ion optical device;

the position of the saddle point is at a central axis of the quadrupole ion optical device when the first set of voltages are supplied to the plurality of electrodes; and the position of the saddle point is moved away from the central axis to the first or second position when the second set of voltages are supplied to the plurality of electrodes.

* * * * *